United States Patent [19]

Weber et al.

[11] Patent Number: 5,374,374

[45] Date of Patent: Dec. 20, 1994

[54] SUPERTWIST LIQUID-CRYSTAL DISPLAY

[75] Inventors: Georg Weber, Erzhausen; Herbert Plach, Darmstadt; Volker Reiffenrath, Rossdorf, all of Germany; Hiroki Yoshitake, Atsugi; Hiroshi Numata, Yokohama, both of Japan

[73] Assignee: Merck Patent Gesellschaft mit Beschrankter Haftung, Darmstadt, Germany

[21] Appl. No.: 774,919

[22] Filed: Oct. 11, 1991

[30] Foreign Application Priority Data

Oct. 13, 1990 [DE] Germany ............... 4032579

[51] Int. Cl.$^5$ .............. C09K 19/34; C09K 19/52; C09K 19/30; G02F 1/13
[52] U.S. Cl. .............. 252/299.63; 252/299.01; 252/299.61; 252/299.64; 252/299.65; 252/299.66; 252/299.67; 359/103
[58] Field of Search .......... 252/299.01, 299.6, 299.61, 252/299.62, 299.63, 299.64, 299.65, 299.66, 299.67, 299.7; 359/103, 104, 106

[56] References Cited

U.S. PATENT DOCUMENTS

| 5,122,295 | 6/1992 | Weber et al. ............ 252/299.01 |
| 5,151,213 | 9/1992 | Reiffenrath et al. ...... 252/299.6 |
| 5,164,114 | 11/1992 | Kurmeier et al. ......... 252/299.61 |
| 5,171,469 | 12/1992 | Hittich et al. ........... 252/299.01 |
| 5,178,790 | 1/1993 | Weber et al. ............ 252/299.01 |
| 5,242,618 | 9/1993 | Krause et al. ........... 252/299.6 |
| 5,308,538 | 5/1994 | Weber et al. ............ 252/299.61 |

*Primary Examiner*—Shean Wu
*Attorney, Agent, or Firm*—Millen, White, Zelano & Branigan

[57] ABSTRACT

Supertwist liquid-crystal displays having excellent properties are obtained using a nematic liquid-crystal mixture based on component A which contains one or more compounds of the formula IIa or IIb:

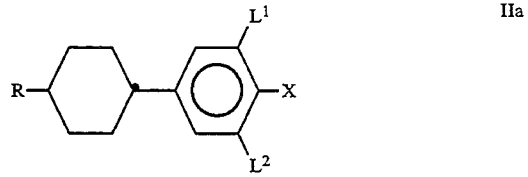

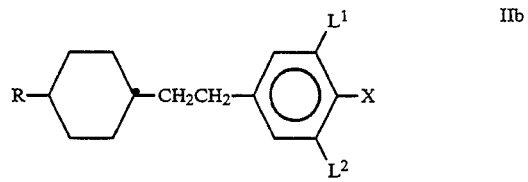

one or more compounds of the formulae IIc to IIe:

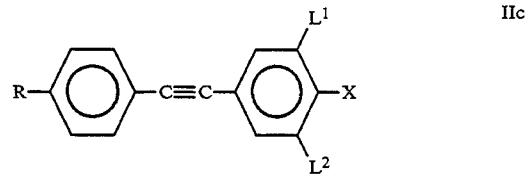

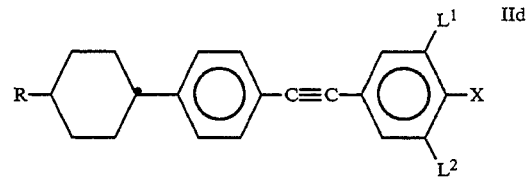

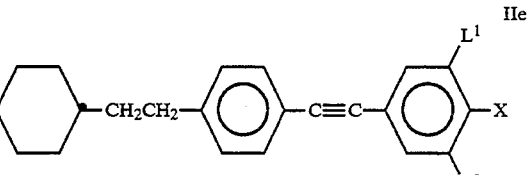

and one or more compounds of the formulae IIf to (Abstract continued on next page.)

-continued
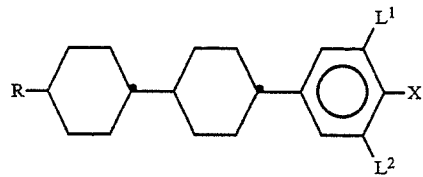 IIf
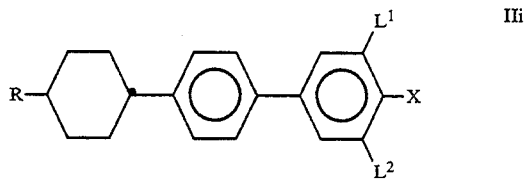 IIi
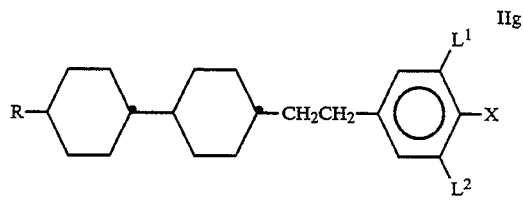 IIg
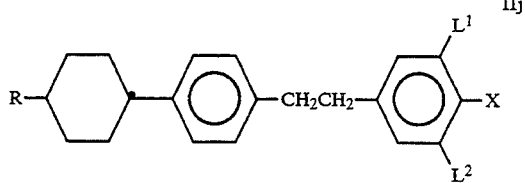 IIj
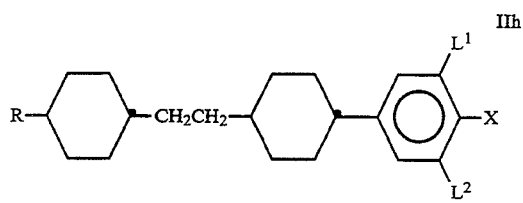 IIh
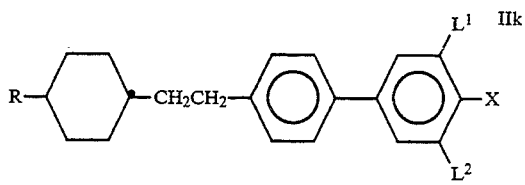 IIk
in which R, $L^1$ and $L^2$ and X are as defined herein.
27 Claims, No Drawings

SUPERTWIST LIQUID-CRYSTAL DISPLAY

SUMMARY OF THE INVENTION

The invention relates to supertwist liquid-crystal displays (SLCD) having very short response times and good steepnesses and angle dependencies, and to the novel nematic liquid-crystal mixtures used therein.

SLCDs as defined in the preamble are known, for example from EP 0 131 216 B1; DE 34 23 993 A1; EP 0 098 070 A2; M. Schadt and F. Leenhouts, 17th Freiburg Congress on Liquid Crystals (8-10.04.87); K. Kawasaki et al., SID 87 Digest 391 (20.6); M. Schadt and F. Leenhouts, SID 87 Digest 372 (20.1); K. Katoh et al., Japanese Journal of Applied Physics, Vol. 26, No. 11, L 1784-L 1786 (1987); F. Leenhouts et al., Appl. Phys. Lett. 50 (21), 1468 (1987); H. A. van Sprang and H. G. Koopman, J. Appl. Phys. 62 (5), 1734 (1987); T. J. Scheffer and J. Nehring, Appl. Phys. Lett. 45 (10), 1021 (1984), M. Schadt and F. Leenhouts, Appl. Phys. Lett. 50 (5), 236 (1987) and E. P. Raynes, Mol. Cryst. Liq. Cryst. Letters Vol. 4 (1), pp. 1-8 (1986). The term SLCD here covers any more highly twisted display element with a value for the twist angle of between 160° and 360°, such as, for example, the display elements of Waters et al. (C. M. Waters et al., Proc. Soc. Inf. Disp. (New York) (1985) (3rd Intern. Display Conference, Kobe, Japan), STN-LCDs (DE-A 35 03 259), SBE-LCDs (T. J. Scheffer and J. Nehring, Appl. Phys. Lett. 45 (1984) 1021), OMI-LCDs (M. Schadt and F. Leenhouts, Appl. Phys. Lett. 50 (1987), 236), DST-LCDs (EP-A 0 246 842) or BW-STN-LCDs (K. Kawasaki et al., SID 87 Digest 391 (20.6)).

SLCDs of this type are distinguished, in comparison to standard TN displays, by significantly better steepnesses of the electrooptical characteristic line and consequently better contrast values, and by significantly less angle dependence of the contrast. Of particular interest are SLCDs having very short response times, in particular also at relatively low temperatures. In order to achieve short response times, the viscosities, in particular, of the liquid-crystal mixtures were hitherto optimized using usually monotropic additives having relatively high vapor pressure. However, the response times achieved were not adequate for all applications.

In order to achieve a steep electrooptical characteristic line, the liquid-crystal mixtures should have relatively large values for $K_3/K_1$ and relatively small values for $\Delta\epsilon/\epsilon_1$.

In addition to optimization of the contrast and the response times, further important requirements are made of mixtures of this type:

1. A broad d/p window
2. High long-term chemical stability
3. High electrical resistance
4. Low frequency dependence of the threshold voltage.

The parameter combinations achieved are still by far inadequate, in particular for high-multiplex STNs (1/400). This is in some cases attributable to the fact that the various requirements are affected in opposite manners by material parameters.

There thus continues to be a great demand for SLCDs having very short response times and at the same time a large operating temperature range, high characteristic line steepness, good angle dependence of the contrast and low threshold voltage which meet the abovementioned requirements.

An object of the invention is to provide SLCDs which do not have the above-mentioned disadvantages, or only do so to a lesser extent, and at the same time have very short response times.

Upon further study of the specification and appended claims, further objects and advantages of this invention will become apparent to those skilled in the art.

It has now been found that these objects can be achieved if the nematic liquid-crystal mixture a) is based on component A, which contains
one or more compounds of the formula IIa or IIb:

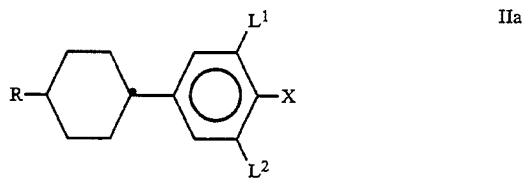

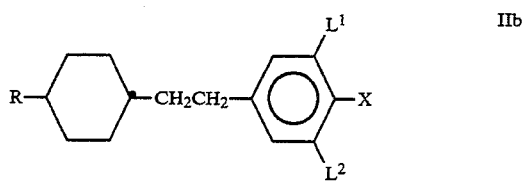

one or more compounds of the formulae IIc to IIe:

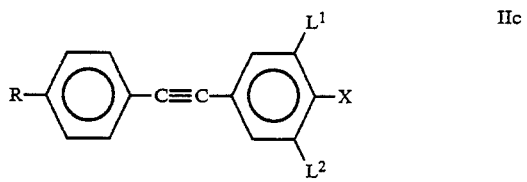

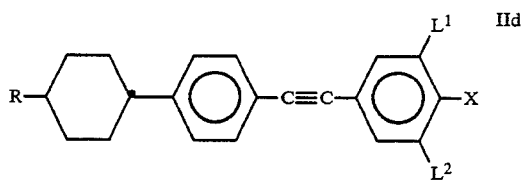

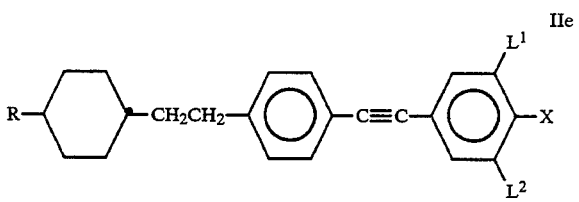

and one or more compounds of the formulae IIf to IIk:

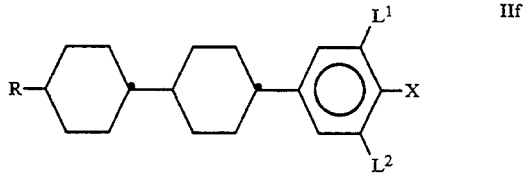

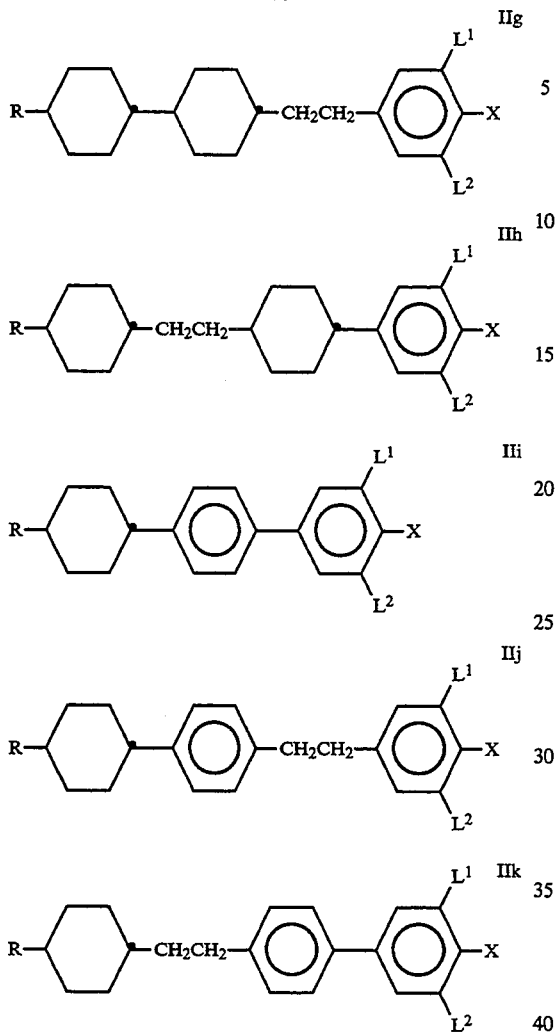

in which
R is n-alkyl, n-alkoxy or n-alkenyl having up to 9 carbon atoms,
$L^1$ and $L^2$ are each H or F, and
X is F, Cl, —CF$_3$, —CHF$_2$, —OCF$_3$, —OCHF$_2$, —OCF$_2$CF$_2$H or —OC$_2$F$_5$, b) contains 0–40% by weight of a liquid-crystalline component B, comprising one or more compounds having a dielectric anisotropy of from −1.5 to +1.5, of the general formula I

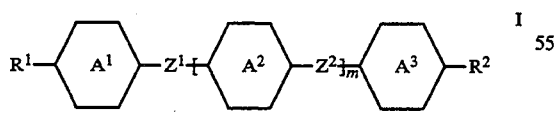

in which $R^1$ and $R^2$ are each, independently of one another, n-alkyl, n-alkoxy, n-oxaalkyl, ω-fluoroalkyl, n-alkenyl or n-alkenyloxy having up to 9 carbon atoms, the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —CH$_2$CH$_2$—, —C≡C— or a single bond, and m is 0, 1 or 2, c) contains 0–20% by weight of a liquid-crystalline component C, comprising one or more compounds having a dielectric anisotropy of below −1.5, and d) contains an optically active component D in such an amount that the ratio between the layer thickness (separation of the plane-parallel outer plates) and the natural pitch of the chiral nematic liquid-crystal mixture is from about 0.2 to 1.7, in particular from about 0.2 to 1.3, and has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C.

The invention thus relates to an SLCD containing
two plane-parallel outer plates which, together with a frame, form a cell,
a nematic liquid-crystal mixture of positive dielectric anisotropy which is present in the cell,
electrode layers with superposed alignment layers on the insides of the outer plates,
a pitch angle between the longitudinal axes of the molecules at the surface of the outer plates and the outer plates of from about 1 degree to 30 degrees, and
a twist angle of the liquid-crystal mixture in the cell from alignment layer to alignment layer with a value of between 100° and 600°, characterized in that the nematic liquid-crystal mixture
a) is based on component A, which contains
one or more compounds of the formula IIa or IIb:

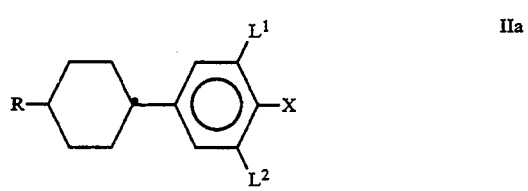

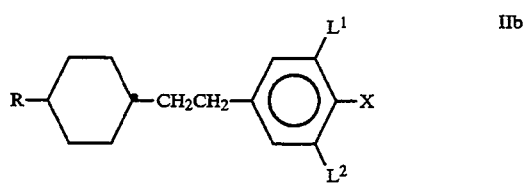

one or more compounds of the formulae IIc to IIe:

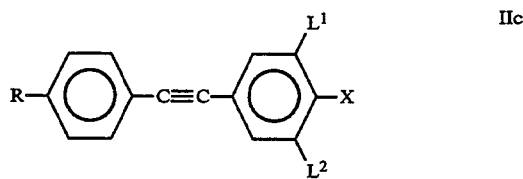

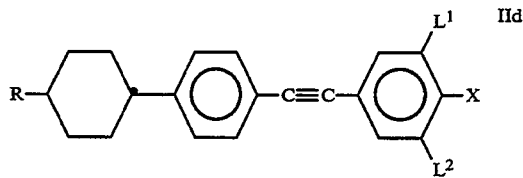

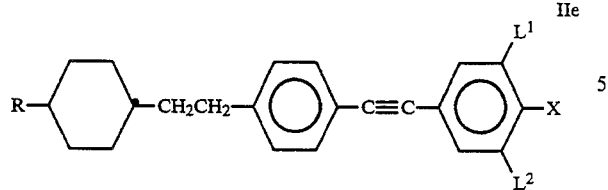

and one or more compounds of the formulae IIf to IIk:

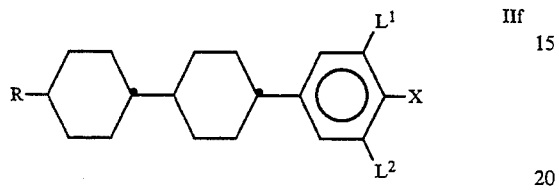

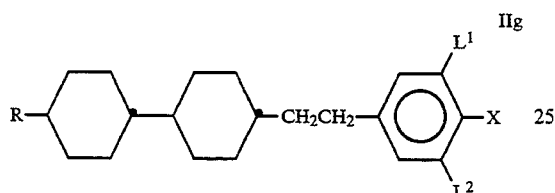

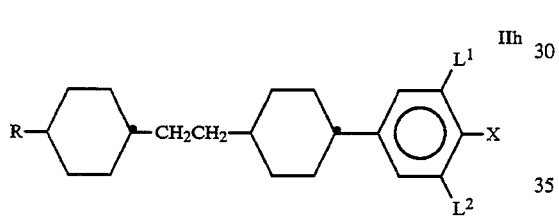

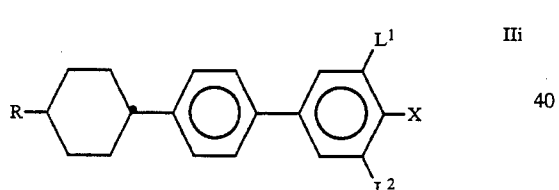

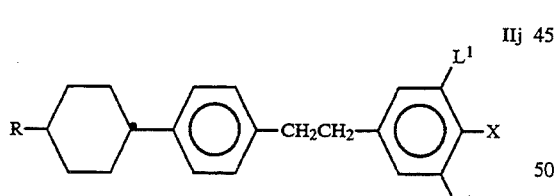

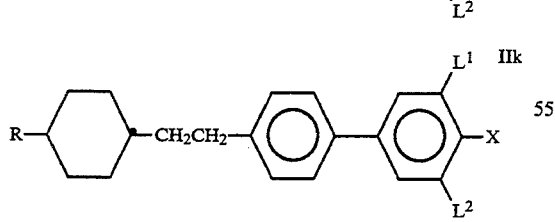

in which
R is n-alkyl, n-alkoxy or n-alkenyl having up to 9 carbon atoms,
$L^1$ and $L^2$ are each H or F, and
X is F, Cl, —$CF_3$, —$CHF_2$, —$OCF_3$, —$OCHF_2$, —$OCF_2CF_2H$ or —$OC_2F_5$, b) contains 0–40% by weight of a liquid-crystalline component B, comprising one or more compounds having a dielectric anisotropy of from −1.5 to +1.5, of the general formula I

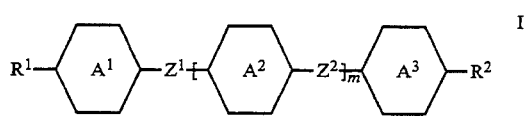

in which $R^1$ and $R^2$ are each, independently of one another, n-alkyl, n-alkoxy, n-oxaalkyl, ω-fluoroalkyl or n-alkenyl having up to 9 carbon atoms, the rings $A^1$, $A^2$ and $A^3$ are each, independently of one another, 1,4-phenylene, 2- or 3-fluoro-1,4-phenylene, trans-1,4-cyclohexylene or 1,4-cyclohexenylene, $Z^1$ and $Z^2$ are each, independently of one another, —$CH_2CH_2$—, —C≡C— or a single bond, and m is 0, 1 or 2, c) contains 0–20% by weight of a liquid-crystalline component C, comprising one or more compounds having a dielectric anisotropy of below −1.5, and d) contains an optically active component D in such an amount that the ratio between the layer thickness (separation of the plane-parallel outer plates) and the natural pitch of the chiral nematic liquid-crystal mixture is from about 0–2 to 1.3, and in that the nematic liquid-crystal mixture has a nematic phase range of at least 60° C., a viscosity of not more than 35 mPa.s and a dielectric anisotropy of at least +1, the dielectric anisotropies of the compounds and the parameters based on the nematic liquid-crystal mixture being based on a temperature of 20° C.

The invention also relates to corresponding liquid-crystal mixtures for use in SLCDs.

A nematic liquid-crystal mixture according to the invention preferably contains 20–99.5 wt. %, particularly preferably 0–99.95 wt. % of component A; 0–40 wt. %, particularly preferably 0–25 wt. % of component B; 0–20 wt. %, particularly preferably 0–10 wt. % of component C; and 0.05–35 wt. %, particularly preferably 0.1–10 wt. % of component D.

The individual compounds, for example of the formulae I and IIa to IIk, or other compounds which can be used in the SLCDs according to the invention are either known or can be prepared analogously to the known compounds. See, for example, U.S. Ser. Nos. 07/362,438 and 07/328,193.

Preferred liquid-crystal mixtures contain
a) at least one component selected from group B4, comprising compounds of the formulae AI to AVI:

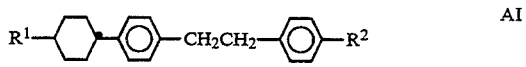

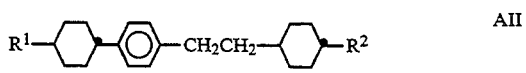

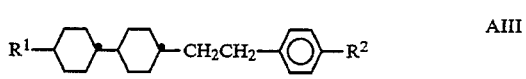

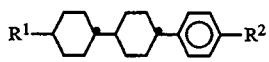 AV

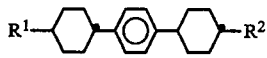 AVI in which

R¹ and R², in each case independently of one another, are each R, and

R is alkyl having 1-12 carbon atoms in which, in addition, one or two non-adjacent CH₂ groups may be replaced by —O—, —CH=CH—, —CO—, —O—CO— or —CO—O—, b) and/or at least one component selected from group B1, comprising the compounds of the formulae BI to BIV:

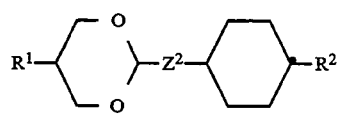 BI

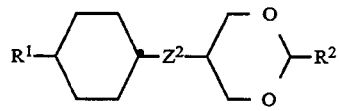 BII

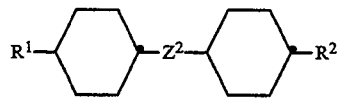 BIII

 BIV in which R¹ and R², in each case independently of one another, are as defined for R, Z² is —CH₂CH₂—, —CO—O—, —O—CO— or a single bond, and

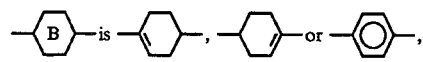

c) and/or at least one component selected from group B2, comprising the compounds of the formulae BV to BVIII:

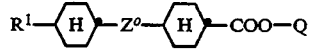 BV

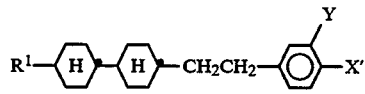 BVI

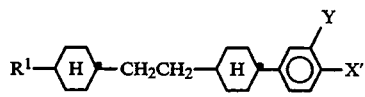 BVII

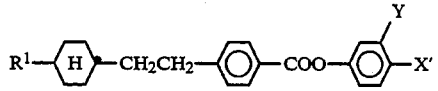 BVIII in which R¹ is as defined for R, Z⁰ is —CH₂CH₂— or a single bond, and

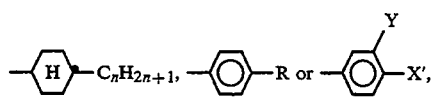

wherein n is 1 to 9, X' is CN or F, and Y is H or F, d) and/or at least one component selected from group B3, comprising the compounds of the formulae BIX and BX:

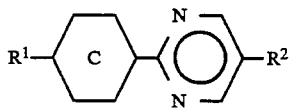 BIX

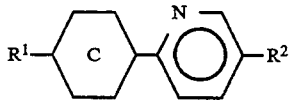 BX in which R¹ and R², in each case independently of one another, are as defined for R, and

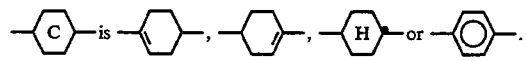

The proportion of compounds of group B1 is preferably 0–45 wt. %, particularly 0–20 wt. %. Also, the proportion of compounds of group B4 is preferably 0–45 wt. %, particularly 0–20 wt. %.

Particularly preferred compounds of the formula BIII are those of the subformulae below:

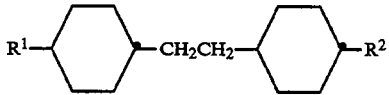

in which

R¹ is $CH_3—(CH_2)_n—O—$, $CH_3—(CH_2)_r—$, trans-$H—(CH_2)_r—CH=(CH_2CH_2)_s—CH_2O—$ or trans-$H—CCH_2)_r—CH=CH—(CH_2CH_2)_s—$, R² is $CH_3—(CH_2)_r—$, n is 1, 2, 3 or 4, r is 0, 1, 2 or 3, s is 0 or 1, and t is 1, 2, 3 or 4.

Furthermore preferred compounds of formula BIII are those of the subformula

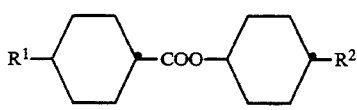

in which $R^1$ and $R^2$ are as defined above.

The proportion of compounds of the formula BIII of the above-mentioned subformulae is preferably from about 5% about 5% to 45%, particularly preferably from about 10% to 35%. Particularly preferred compounds of the formula BIV are those of the subformula below:

in which
$R^1$ is $CH_3—(CH_2)_n—O—$ or trans-$H—(CH_2)_r—CH=CH—(CH_2CH_2)_s—CH_2O—$, and
$R^2$ is $CH_3—(CH_2)_t—$, where
n is 1, 2, 3 or 4,
r is 0, 1, 2 or 3,
s is 0 or 1, and
t is 1, 2, 3 or 4.

The proportion of these compounds or of the compounds of the formula BIV is preferably from about 5% to 40%, particularly preferably from about 10% to 35%.

The mixtures preferably contain compounds of the formula BIII, in particular those of the subformula

in which
$R^1$ is $CH_3—(CH_2)_n—O—$, $CH_3—(CH_2)_t—$, trans-$H—(CH_2)_r—CH=CH—(CH_2CH_2)_s—CH_2O—$ or trans-$H-(CH_2)_r—CH=CH—(CH_2CH_2)_s—$,
$R^2$ is $CH_3—(CH_2)_t—$,
n is 1, 2, 3 or 4,
r is 0, 1, 2 or 3,
s is 0 or 1, and
t is 1, 2, 3 or 4.

In a particularly preferred embodiment the mixtures simultaneously contain compounds of the formulae BIII and BIV, the total proportion for components of group B1 being observed.

If compounds of the formulae BI and/or BIII are present, $R^1$ and $R^2$ are preferably each, independently of one another, n-alkyl having 1 to 7 carbon atoms or (trans)-n-alkenyl having 3 to 7 carbon atoms. $Z^2$ is preferably a single bond. BI is particularly preferred.

Furthermore preferred are mixtures according to the invention which contain one or more compounds of the formula BIV in which

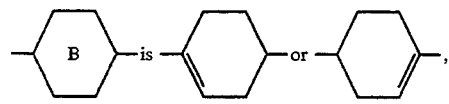

and $R^1$ and $R^2$ have one of the abovementioned preferred meanings particularly preferably are n-alkyl having 1 to 7 carbon atoms.

In any case, the total proportion for components of group B1 is observed.

The proportion of compounds of group B2 is preferably from about 5% to 45%, particularly preferably from 5% to 20%. The proportion (preferred ranges) for BV to BVII is as follows:

BV from about 5% to 30%, preferably from about 5% to 15%

Sum of BVI and BVII: from about 5% to 25%, preferably from about 10% to 20%.

Preferred compounds of group B2 are indicated below:

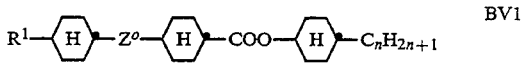
BV1

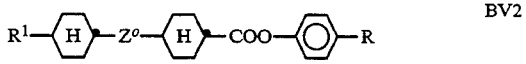
BV2

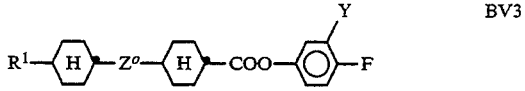
BV3

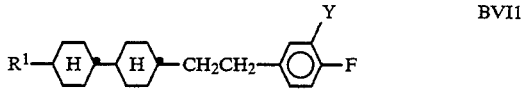
BVI1

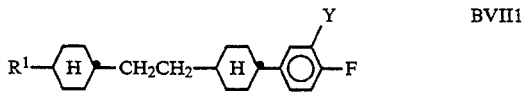
BVII1

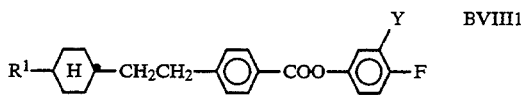
BVIII1

$R^1$ is preferably n-alkyl having 1 to 7 carbon atoms or (trans)-n-alkenyl having 3 to 7 carbon atoms. $Z^o$ is preferably a single bond. R preferably has the preferred meaning given above for $R^1$ or is fluorine. Y is preferably fluorine.

The mixtures according to the invention preferably contain one or more compounds selected from the group comprising BV3, BVI1 and BVII1 in a total proportion of from about 5 to 35%.

In a particularly preferred embodiment, the mixtures according to the invention contain, in addition to BV3, BVI1, BVIII1 and BV2, further terminally fluorinated compounds, for example selected from the group comprising:

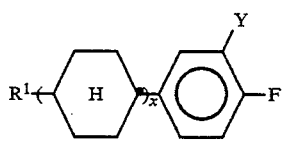

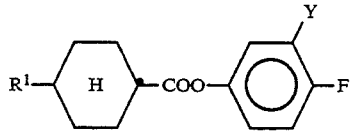

and/or polar heterocyclic compounds selected from the group comprising

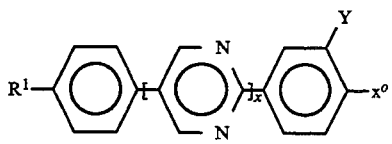

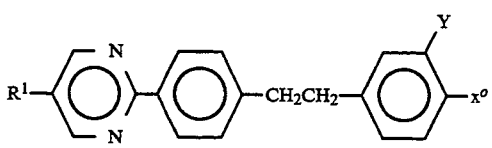

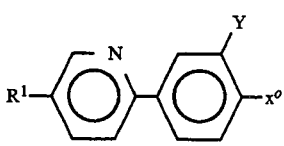

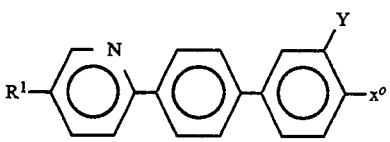

in which $R^1$ is preferably n-alkyl having 1 to 7 carbon atoms or (trans)-n-alkenyl having 3 to 7 carbon atoms, x is 1 or 2, $X°$ is F, Cl, $CF_3$, $—OCF_3$ or $—OCHF_3$, and Y is H or F. The total proportion of all terminally fluorinated compounds is preferably from about 5% to 65%, in particular from about 15% to 40%.

The proportion of compounds from group B3 is preferably from about 5% to 30%, particularly preferably from about 10% to 20%. $R^1$ is preferably n-alkyl or n-alkoxy having 1 to 9 carbon atoms each. $R^2$ is preferably n-alkyl having 1 to 9 carbon atoms. However, it is also possible to employ analogous compounds containing alkenyl or alkenyloxy groups. Compounds of the formula BVIII are preferred.

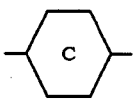

The mixtures according to the invention preferably contain compounds from at least one of groups B1, B2 and B3. They preferably contain one or more compounds from group B1 and one or more compounds from group B2 and/or B3.

Furthermore preferred are isothiocyanates, for example of the formula

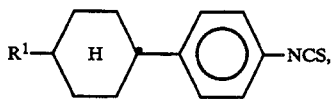

in which $R^1$ is n-alkyl having 1 to 7 carbon atoms or n-alkenyl having 3 to 7 carbon atoms.

In a particularly preferred embodiment, the mixtures according to the invention preferably contain from about 5% to 20% of one or more compounds having a dielectric anisotropy of below −1.5 (component C). Compounds of this type are known, for example derivatives of 2,3-dicyanohydroquinone or cyclohexane derivatives containing the structural element

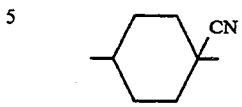

as in DE-A32 31 707 and DE-A 34 07 013.

However, for compounds of component C, preference is given to compounds containing the structural element 2,3-difluoro-1,4-phenylene, for example compounds as in DE-A 38 07 801, 38 07 861, 38 07 863, 38 07 864 or 38 07 908. Particular preference is given to tolans containing this structural element, as in the International Patent Application PCT/DE 88/00133, in particular those of the formulae

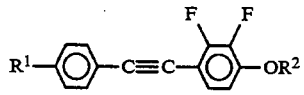

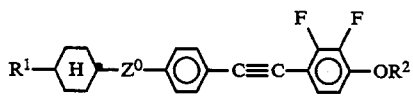

in which $R^1$ and $R^2$ are each, independently of one another, preferably n-alkyl having 1 to 7 carbon atoms or n-alkenyl having 3 to 7 carbon atoms, and $Z°$ is $—CH_2CH_2—$ or a single bond, and the phenylpyrimidines of the formula

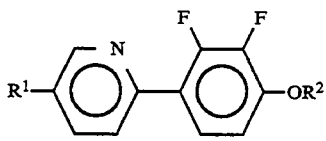

in accordance with DE-A 38 07 871.

In a particularly preferred embodiment, the mixtures contain from about 5% to 35%, particularly preferably from about 10% to 20%, of liquid-crystalline tolan compounds. This allows smaller layer thicknesses (about 5–6 μm) to be used, giving significantly shorter response times. Particularly preferred tolans are indicated below:

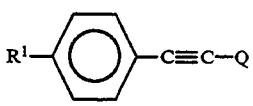

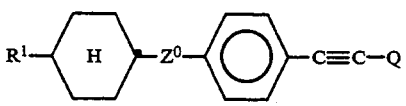

$R^1$ is preferably n-alkyl or n-alkoxy having 1 to 7 carbon atoms,
$Z°$ is $—CH_2CH_2—$ or a single bond,
Q is

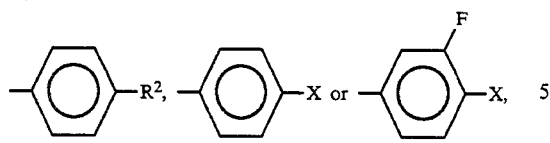

where

X is F, Cl or OCF$_3$, and

R$^2$ is n-alkyl or n-alkoxy, having 1 to 7 carbon atoms each, or n-alkenyl or n-alkenyloxy having 3 to 7 carbon atoms each.

The following are further particularly preferred embodiments:

component A contains compounds of the formulae IIa, IIb, IIc, IIg and IIi in which X is F, and compounds of the formulae IId, IIe, IIf, IIg and IIi in which X is —CF$_3$, $OCF_3$ or —OCHF$_2$, and component A further contains cyano compounds such as compounds of formula I with R$^2$ being instead CN, the proportion of the cyano compounds in component A being from 0 to 50% by weight, preferably from 20 to 45% by weight.

preferred cyano compounds are the compounds of the formulae C1 to C4

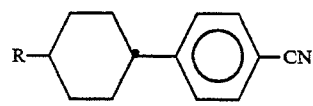

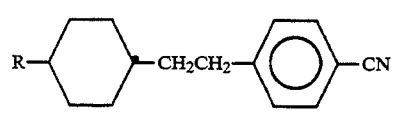

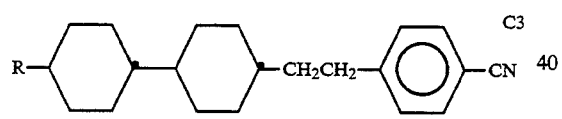

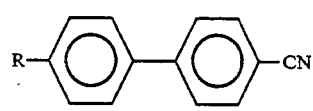

component A contains one or more compounds of the formulae IIa1–IIa3, IIc1–IIc4, IId1–IId3 and IIf1–IIf4

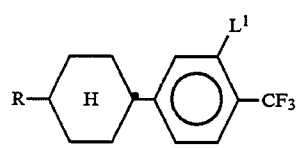

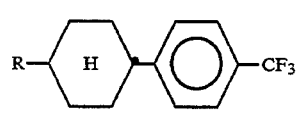

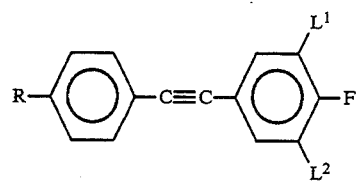

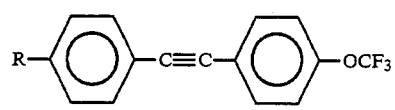

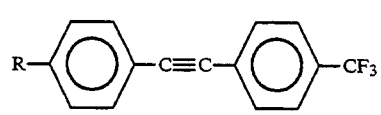

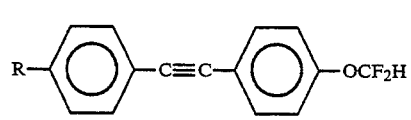

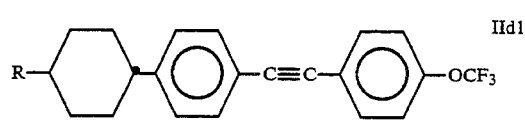

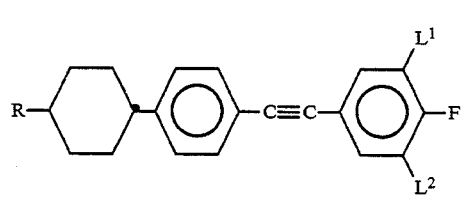

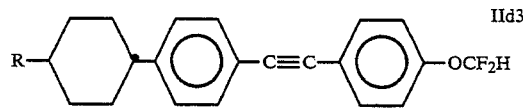

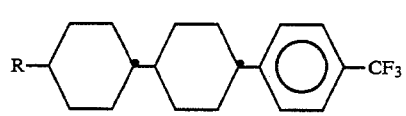

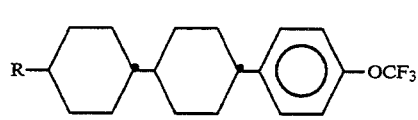

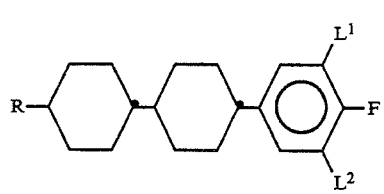

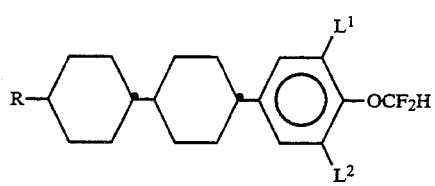

in which R is n-alkyl, n-alkoxy or n-alkenyl having 1–9 carbon atoms, component A furthermore contains one or more compounds of the formulae IIg1–IIg3

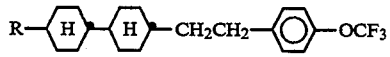 IIg1

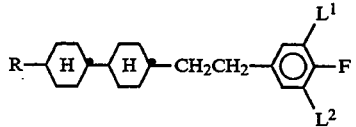 IIg2

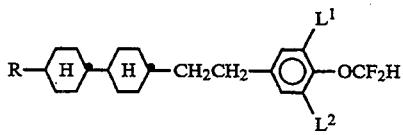 IIg3 in which R is $C_nH_{2n+1}$ where n=1–9,
component A contains, in addition to the compounds of the formulae IIa to IIk, one or more compounds of the formula

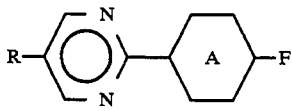

in which
R is n-alkyl, n-alkoxy or n-alkenyl having 1–9 carbon atoms, and

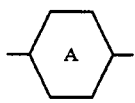

is 1,4-phenylene or 2- or 3-fluoro-1,4-phenylene,
X is F, Cl, CF₃, —OCF₃, —OCHF₂ or —CHF₂,
component B contains one or more compounds selected from the group comprising I1 to I8:

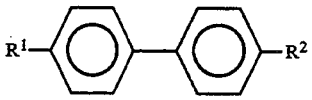 I1

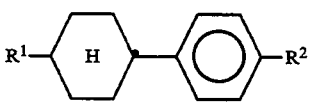 I2

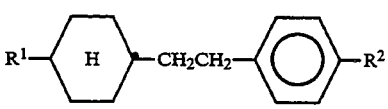 I3

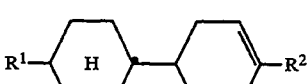 I4

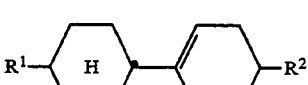 I5

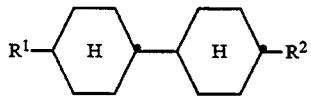 I6

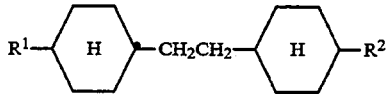 I7

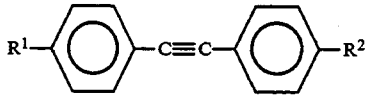 I8 in which R¹ and R² are each, independently of one another, n-alkyl, n-alkoxy, n-oxaalkyl, ω-fluoroalkyl, n-alkenyl or n-alkenyloxy having up to 9 carbon atoms,
component B additionally contains one or more compounds selected from the group comprising I9 to I24:

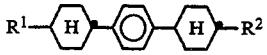 I9

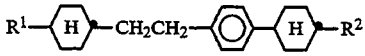 I10

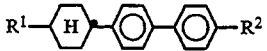 I11

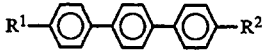 I12

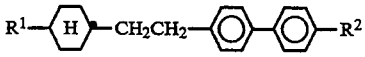 I13

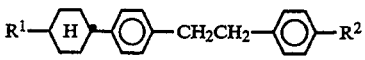 I14

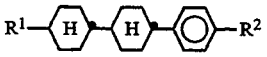 I15

 I16

 I17

 I18

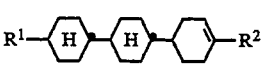 I19

 I20

 I21

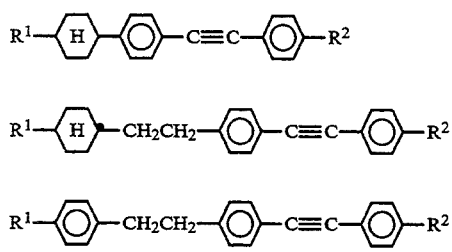

I22

I23

I24 in which R¹ and R² are each, independently of one another, n-alkyl, n-alkoxy, n-oxaalkyl, ω-fluoroalkyl, n-alkenyl or n-alkenyloxy having up to 9 carbon atoms, and the 1,4-phenylene groups in I9 to I18 may each, independently of one another, also be monosubstituted by fluorine, component B additionally contains one or more compounds selected from the group comprising I25 to I29:

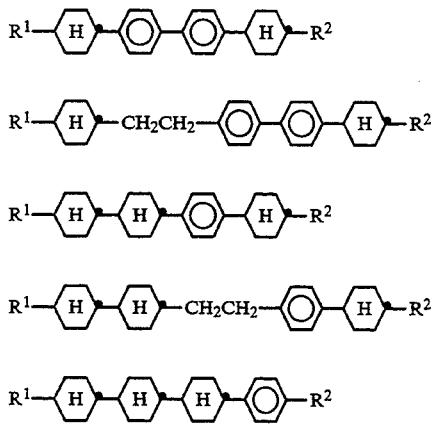

I25

I26

I27

I28

I29 in which R¹ and R² are each, independently of one another, n-alkyl, n-alkoxy, n-oxaalkyl, ω-fluoroalkyl, n-alkenyl or n-alkenyloxy having up to 9 carbon atoms, and the 1,4-phenylene groups in I25 to I29 may each, independently of one another, also be monosubstituted by fluorine, component B contains one or more compounds selected from the group comprising I30 and I31:

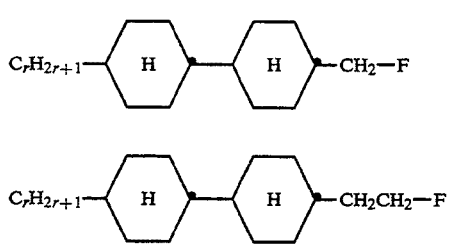

I30

I31 in which $C_rH_{2r+1}$ is a straight-chain alkyl group having up to 7 carbon atoms, the liquid-crystal mixture contains, in addition to components A, B and C, additionally one or more compounds selected from the group comprising III and IV:

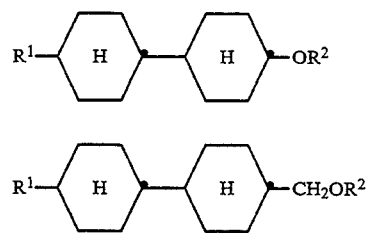

III

IV in which R¹ and R² are each, independently of one another, n-alkyl, n-alkoxy, n-oxaalkyl, ω-fluoroalkyl or n-alkenyl having up to 9 carbon atoms, the liquid-crystal mixture contains, in addition to components A, B and C, additionally one or more compounds selected from the group comprising V and VI:

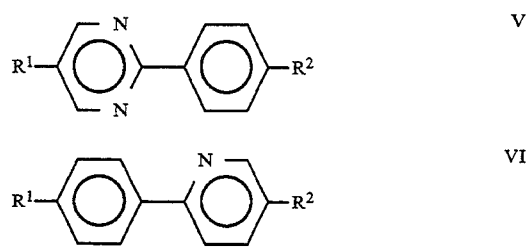

V

VI in which R¹ and R² are each, independently of one another, n-alkyl, n-alkyl, n-oxaalkyl, ω-fluoroalkyl or n-alkenyl having up to 9 carbon atoms, component C contains one or more compounds selected from the group comprising VII to XI:

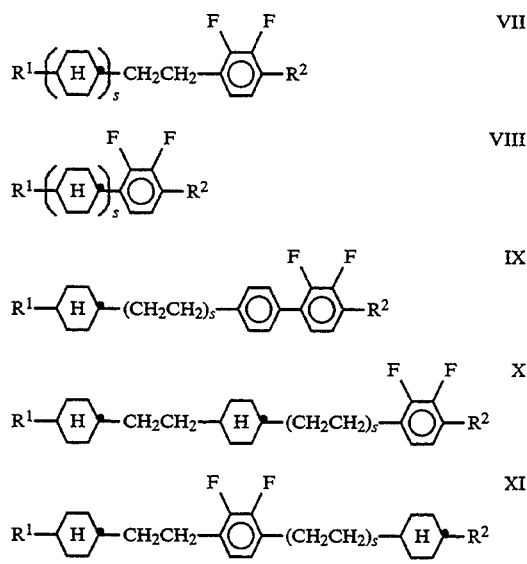

VII

VIII

IX

X

XI in which R¹ and R² are each, independently of one another, n-alkyl, n-alkoxy, n-oxaalkyl, ω-fluoroalkyl, n-alkenyl or n-alkenyloxy having up to 9 carbon atoms, and S is 0 or 1, component B contains one or more compounds selected from the group comprising XII to XIV:

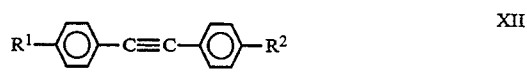

XII

-continued

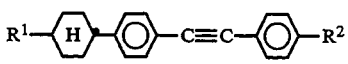
XIII

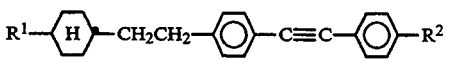
XIV in which $R^1$ and $R^2$ are as defined in claim 1.

Preference is given to mixtures which contain exclusively compounds of the formulae IIa to IIh (group A) and component C, i.e., contain no compounds of component B.

The preferred mixtures containing terminally halogenated compounds of the formulae IIa to IIk (X=F, Cl, —CF$_3$, —CHF$_2$, —OCF$_3$ or —OCHF$_3$) have particularly favorable parameter combinations and simultaneously a broad d/p window.

Liquid-crystal mixtures according to the invention whose component A contains at least one compound of the formula

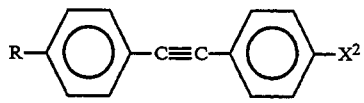

in which
R is $C_nH_{2n+1}$, —$OC_nH_{2n+1}$,

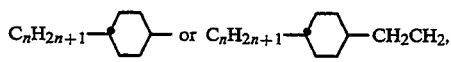

n is an integer from 1 to 9, and
$X^2$ is F, Cl or OCF$_3$,
and a compound of the formulae IId2–IId5, IIa1–IIa3 and IIf1–IIf3 have favorable values for the threshold voltage $V_{10/0/20}$ and the flow viscosity and are characterized by relatively high or high values for the optical anisotropy. Since, due to the relatively high or high value for Δn, the layer thickness d can be chosen to be relatively small, displays driven using these particularly preferred mixtures are generally characterized by favorable values for the switch-on and/or switch-off times $t_{on}$ and/or $t_{off}$. These mixtures are preferred.

A wide range of chiral dopes, some of which are commercially available, are available to a person skilled in the art for component D. Their choice is not crucial per se. Suitable chiral dopants are disclosed in, for example, DE 35 23 185.

The liquid-crystal mixtures used in the SLCDs according to the invention are dielectrically positive with Δε≧1. Particular preference is given to liquid-crystal mixtures where Δε is ≧3 and very particularly to those where Δε is ≧5.

The liquid-crystal mixtures according to the invention have Favorable values for the threshold voltage $V_{10/0/20}$ and for the flow viscosity η. If the value for the optical path difference d.Δn is specified, the value for the layer thickness d is determined by the optical anisotropy Δn. In particular at relatively high or high values for d. An, tile use of liquid-crystal mixtures according to the invention having a relatively high or high value for the optical anisotropy is generally preferred since the value for d can then be chosen to be relatively small, which results in more favorable values for the response times. However, liquid-crystal displays according to the invention which contain liquid-crystal mixtures according to the invention having relatively small values for Δn are also characterized by advantageous values for the response times. The liquid-crystal mixtures according to the invention are furthermore characterized by advantageous values for the steepness of the electrooptical characteristic line and can be operated at high multiplex rates. In addition, the liquid-crystal mixtures according to the invention have high stability and favorable values for the electrical resistance and the frequency dependence of the threshold voltage. The liquid-crystal displays according to the invention have a broad operating temperature range and good angle dependence of the contrast.

The construction of the liquid-crystal display elements according to the invention from polarizers, electrode base plates and electrodes with a surface treatment such that the preferential alignment (director) of the liquid-crystal molecules in each case adjacent thereto is usually twisted by a value of from 160° to 360° from one electrode to the next, corresponds to the structure which is conventional for display elements of this type. The term conventional structure here is broadly drawn and also includes all derivatives and modifications of the supertwist cell, in particular also matrix display elements, and the display elements of DE-A 2 748 738, which contain additional magnets. The surface tilt angle at the two outer plates may be identical or different. Identical tilt angles are preferred.

An essential difference of the display elements according to the invention to those customary hitherto based on the twisted nematic cell is, however, the choice of the liquid-crystal components of the liquid-crystal layer.

The liquid-crystal mixtures which can be used according to the invention are prepared in a manner which is known per se.

In general, the desired amount of the components used in a lesser amount is dissolved in the components making up the principal constituent, expediently at elevated temperature. It is also possible to mix solutions of the components in an organic solvent, for example in acetone, chloroform or methanol, and, after mixing, to remove the solvent again, for example by distillation.

The dielectrics may also contain further additives which are known to a person skilled in the art and are described in the literature. For example, 0–15% of pleochroic dyes may be added.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding German application P 40 32 579.2, are hereby incorporated by reference.

EXAMPLES

The examples below are intended to illustrate the invention without representing a limitation.

The following abbreviations are used:

| | |
|---|---|
| S-N | smectic-nematic phase transition temperature, |
| c.p. | clearing point, |
| visc. | viscosity (mPa · s), |
| $T_{on}$ | time from switching on until 90% of the maximum contrast is achieved, |
| $T_{off}$ | time from switching off until 10% of the maximum contrast is achieved. |

The SLCD is operated in multiplex mode (multiplex ratio 1:100, bias 1:11, operating voltage 18.5 volts).

Above and below, all temperatures are indicated in ° C. The percentages are per cent by weight. The values for the response times and viscosities relate to 20° C.

Example 1

An SLCD of the STN type having the following parameters:

| | |
|---|---|
| twist angle | 240° |
| pitch angle | 5° |
| d · Δn | 1.026 | and containing a liquid-crystal mixture having the following parameters:

| | |
|---|---|
| clearing point: | 84° C. |
| Δn: | 0.1496 |
| Δε: | +7.2 |
| viscosity (20° C.): | 15 mPa · s | and comprising a base mixture comprising

| | |
|---|---|
| 20.0% of | PCH-3 |
| 14.0% of | PCH-5F |
| 6.0% of | PCH-6F |
| 4.0% of | PCH-301 |
| 6.0% of | PTP-20F |
| 5.0% of | PTP-40F |
| 5.0% of | CCP-20CF$_3$ |
| 5.0% of | CCP-30CF$_3$ |
| 5.0% of | CCP-40CF$_3$ |
| 5.0% of | CCP-50CF$_3$ |
| 8.0% of | CPTP-50CF$_3$ |
| 5.0% of | CPTP-301 |
| 6.0% of | CPTP-302 |
| 6.0% of | CPTP-303 | and a chiral component (2-octyl p-(p-n-hexylbenzoyloxy)benzoate) has the following threshold voltages: $V_{10/0/20}$ 2.01 volts, $V_{90/0/20}$ 2.19 volts.

Example 2

An SLCD corresponding to Example 1 contains a liquid-crystal mixture comprising

| | | |
|---|---|---|
| PCH-5F | 7.0% | Clearing point 86° C. |
| PCH-6F | 7.0% | Δn 0.1406 |
| EHP-3F.F | 11.0% | |
| EHP-5F.F | 11.0% | |
| BCH-3F.F | 13.0% | |
| BCH-5F.F | 13.0% | |
| CPTP-30CF$_3$ | 5.0% | |
| CPTP-50CF$_3$ | 5.0% | |
| ECCP-3F.F | 9.0% | |
| ECCP-5F.F | 9.0% | |
| PTP-20F | 5.0% | |
| PTP-40F | 5.0% | | and the chiral component from Example 1 and has the following threshold voltage:

$V_{10/020}$ 2.04 volts.

Example 3

An SLCD corresponding to Example 1 contains a liquid-crystal mixture comprising

| | | |
|---|---|---|
| PCH-5F | 7.0% | Clearing point 94° C. |
| PCH-6F | 7.0% | Δn 0.1406 |
| ECCP-3F.F | 9.0% | |
| ECCP-5F.F | 9.0% | |
| ECCP-30CF$_3$ | 5.0% | |
| ECCP-50CF$_3$ | 4.0% | |
| CCP-30CF$_3$ | 4.0% | |
| CCP-50CF$_3$ | 4.0% | |
| BCH-3F.F | 13.0% | |
| BCH-5F.F | 13.0% | |
| CPTP-30CF$_3$ | 6.0% | |
| CPTP-50CF$_3$ | 6.0% | |
| PTP-20F | 5.0% | |
| PTP-40F | 5.0% | |
| PTP-102 | 3.0% | | and the chiral component from Example 1 and has the following threshold voltage:

$V_{10/0/20}$ 2.48 volts.

Example 4

An SLCD corresponding to Example 1 contains a liquid-crystal mixture comprising

| | | |
|---|---|---|
| PYP-3F | 7.0% | Clearing point 87° C. |
| PYP-5F | 7.0% | Δn 0.1457 |
| PCH-5F | 4.0% | |
| ECCP-3F.F | 9.0% | |
| ECCP-5F.F | 9.0% | |
| ECCP-30CF$_3$ | 4.0% | |
| ECCP-50CF$_3$ | 4.0% | |
| CCP-30CF$_3$ | 4.0% | |
| CCP-50CF$_3$ | 4.0% | |
| BCH-3F.F | 13.0% | |
| BCH-5F.F | 13.0% | |
| CPTP-30CF$_3$ | 6.0% | |
| CPTP-50CF$_3$ | 6.0% | |
| PTP-20F | 5.0% | |
| PTP-40F | 5.0% | | and the chiral component from Example 1 and has the following threshold voltage:

, $V_{10/0/20}$ 2.25 volts.

Example 5

An SLCD cortes ponding to Example 1 contains a liquid-crystal mixture comprising

| | | |
|---|---|---|
| PCH-3 | 15.0% | Clearing point 83° C. |
| PCH-5F | 10.0% | Δn 0.1422 |
| PCH-4F | 6.0% | |
| CCP-30CF$_3$ | 6.0% | |
| CCP-40CF$_3$ | 4.0% | |
| CCP-50CF$_3$ | 6.0% | |
| ECCP-30CF$_3$ | 5.0% | |
| ECCP-50CF$_3$ | 5.0% | |
| ECCP-3F.F | 6.0% | |
| ECCP-5F.F | 6.0% | |
| PTP-102 | 4.0% | |

-continued

| | |
|---|---|
| PTP-201 | 6.0% |
| PTP-20F | 5.0% |
| PTP-40F | 5.0% |
| CPTP-301 | 4.0% |
| CPTP-302 | 3.0% |
| CPTP-303 | 4.0% | and the chiral component from Example 1 and has the following threshold voltage:

$V_{10/0/20}$ 2.18 volts.

Example 6

An SLCD corresponding to Example 1 contains a liquid-crystal mixture comprising

| | | |
|---|---|---|
| PCH-5F | 6.0% | Clearing point 79° C. |
| PCH-6F | 6.0% | $\Delta n$ 0.1545 |
| PCH-7F | 5.0% | |
| CCP-20CF$_3$ | 7.0% | |
| CCP-30CF$_3$ | 10.0% | |
| CCP-50CF$_3$ | 10.0% | |
| BCH-3F.F | 13.0% | |
| BCH-5F.F | 13.0% | |
| PTP-40F | 10.0% | |
| PTP-50F | 8.0% | |
| PTP-102 | 5.0% | |
| PTP-201 | 5.0% | |
| CPTP-301 | 2.0% | | and the chiral component from Example 1 and has the following threshold voltage:

$V_{10/0/20}$ 2.50 volts.

Example 7

An SLCD corresponding to Example 1 contains a liquid-crystal mixture comprising

| | | |
|---|---|---|
| PTP-40F | 6.0% | Clearing point 79° C. |
| K9 | 6.0% | Viscosity (20° C.) 15 mm$^2$s$^{-1}$ |
| PCH-3 | 12.0% | $\Delta n$ 0.1399 |
| PCH-5 | 10.0% | |
| PCH-5F | 7.0% | |
| PCH-301 | 10.0% | |
| CCP-30CF$_3$ | 7.0% | |
| CCP-50CF$_3$ | 6.0% | |
| ECCP-31 | 6.0% | |
| ECCP-32 | 6.0% | |
| ECCP-33 | 6.0% | |
| ECCP-35 | 5.0% | |
| PTP-201 | 4.0% | |
| PTP-102 | 4.0% | |
| CPTP-302 | 5.0% | | and the chiral component from Example 1 and has the following threshold voltage:

$V_{10/0/20}$ 2.22 volts.

Example 8

An SLCD corresponding to Example 1 contains a liquid-crystal mixture comprising

| | | |
|---|---|---|
| PCH-5F | 6.0% | Clearing point 84° C. |
| PCH-6F | 6.0% | $\Delta n$ 0.1401 |
| PCH-7F | 7.0% | |
| PTP-102 | 4.0% | |

-continued

| | |
|---|---|
| PTP-201 | 5.0% |
| PTP-40F | 6.0% |
| CCP-20CF$_3$ | 6.0% |
| CCP-30CF$_3$ | 6.0% |
| CCP-40CF$_3$ | 6.0% |
| CCP-50CF$_3$ | 6.0% |
| ECCP-30CF$_3$ | 4.0% |
| BCH-3F.F | 13.0% |
| BCH-5F.F | 13.0% |
| CPTP-30CF$_3$ | 6.0% |
| CPTP-50CF$_3$ | 6.0% | and the chiral component from Example 1 and has the following threshold voltage:

$V_{10/0/20}$ 2.39 volts.

Example 9

An SLCD corresponding to Example 1 contains a liquid-crystal mixture comprising

| | | |
|---|---|---|
| PCH-3 | 20.0% | Clearing point 82° C. |
| PCH-5 | 8.0% | $\Delta n$ 0.1506 |
| PCH-5F | 12.0% | Viscosity (20° C.) 16 mm$^2$s$^{-1}$ |
| PCH-301 | 4.0% | |
| PTP-20F | 6.0% | |
| PTP-40F | 5.0% | |
| CCP-20CF$_3$ | 4.0% | |
| CCP-30CF$_3$ | 4.0% | |
| CCP-50CF$_3$ | 4.0% | |
| ECCP-30CF$_3$ | 5.0% | |
| ECCP-50CF$_3$ | 5.0% | |
| CPTP-301 | 5.0% | |
| CPTP-302 | 5.0% | |
| CPTP-303 | 5.0% | |
| PTP-102 | 4.0% | | and the chiral component from Example 1 and has the following threshold voltage:

$V_{10/02/0}$ 2.13 volts.

| | |
|---|---|
| PCH-53: | trans-1-p-propylphenyl-4-pentylcyclohexane |
| I-32: | 1-(trans-4-propylcyclohexyl)-2-(4'-ethyl-2'-fluorobiphenyl-4-yl)ethane |
| I-35: | 1-(trans-4-propylcyclohexyl)-2-(4'-pentyl-2'-fluorobiphenyl-4-yl)ethane |
| BCH-32: | 4-ethyl-4'-(trans-4-propylcyclohexyl)-biphenyl |
| BCH-52: | 4-ethyl-4'-(trans-4-pentylcyclohexyl)-biphenyl |
| CCH-303: | trans,trans-4-propoxy-4'-propylcyclohexyl-cyclohexane |
| CCH-501: | trans,trans-4-methoxy-4'-pentylcyclo-hexylcyclohexane |
| CH-35: | trans-4-pentylcyclohexyl trans,trans-4-propylcyclohexylcyclohexanecarboxylate |
| CH-43: | trans-4-propylcyclohexyl trans,trans-4-butylcyclohexylcyclohexanecarboxylate |
| CH-45: | trans-4-pentylcyclohexyl trans,trans-4-butylcyclohexylcyclohexanecarboxylate |
| PCH-302: | trans-1-p-ethoxyphenyl-4-propylcyclohexane |
| PCH-303: | trans-1-p-propoxyphenyl-4-propylcyclohexane |
| PCH-30: | trans-1-p-butoxyphenyl-4-propylcyclohexane |
| CCH-502: | trans,trans-4-ethoxy-4'-pentylcyclo-hexylcyclohexane |
| ECCP-32: | 1-[trans-4-(trans-4-propylcyclohexyl)cyclo-hexyl]-2-(p-ethylphenyl)ethane |
| ECCP-31: | 1-[trans-4-(trans-4-propylcyclohexyl)cyclo-hexyl]-2-(p-methylphenyl)ethane |
| ECCP-35: | 1-[trans-4-(trans-4-propylcyclohexyl)cyclo-hexyl]-2-(p-pentylphenyl)ethane |
| PCH-501: | trans-1-p-methoxyphenyl-4-pentylcyclohexane |

| | -continued |
|---|---|
| PCH-502: | trans-1-p-ethoxyphenyl-4-pentylcyclohexane |
| CP-33: | p-propylphenyl trans,trans-4-propylcyclohexylcyclohexanecarboxylate |
| CP-35: | p-pentylphenyl trans,trans-4-propylcyclohexylcyclohexanecarboxylate |
| CP-43: | p-propylphenyl trans,trans-4-butylcyclohexylcyclohexanecarboxylate |
| CP-45: | p-pentylphenyl trans,trans-4-butylcyclohexylcyclohexanecarboxylate |
| PTP-40F: | 4-butoxy-4'-fluorotolan |
| PTP-50F: | 4-pentoxy-4'-fluorotolan |
| PTP-20F: | 4-ethoxy-4'-fluorotolan |
| PCH-301: | trans-1-p-methoxyphenyl-4-propylcyclohexane |
| CCH-301: | trans,trans-4-methoxy-4'-propylcyclohexylcyclohexane |
| CBC-33F: | 4,4'-bis(trans-4-propylcyclohexyl)-2-fluorobiphenyl |
| CBE-55F: | 4,4'-bis(trans-4-pentylcyclohexyl)-2-fluorobiphenyl |
| CBC-53F: | 4-(trans-4-pentylcyclohexyl)-4'-(trans-4-propylcyclohexyl)-2-fluorobiphenyl |
| CBC-33: | 4,4'-bis(trans-4-propylcyclohexyl)biphenyl |
| CBC-55: | 4,4'-bis(trans-4-pentylcyclohexyl)biphenyl |
| CBC-53: | 4-(trans-4-pentylcyclohexyl)-4'-(trans-4-propylcyclohexyl)biphenyl |
| ECCP-33: | 1-[trans-4-(trans-4-propylcyclohexyl)cyclohexyl]-2-(p-propylphenyl)ethane |
| CCH-51F: | trans,trans-4-fluoromethyl-4'-pentylcyclohexylcyclohexane |
| CCH-31F: | trans,trans-4-fluoromethyl-4'-propylcyclohexylcyclohexane |
| PTP-102: | 4-methyl-4'-ethoxytolan |
| PTP-201: | 4-methoxy-4'-ethyltolan |
| CPTP-301: | 4-(trans-4-propylcyclohexyl)-4'-methoxytolan |
| CPTP-302: | 4-(trans-4-propylcyclohexyl)-4'-ethoxytolan |
| CPTP-303: | 4-(trans-4-propylcyclohexyl)-4'-propoxytolan |
| PCH-5F: | trans-1-p-fluorophenyl-4-pentylcyclohexane |
| PCH-6F: | trans-1-p-fluorophenyl-4-hexylcyclohexane |
| PCH-7F: | trans-1-p-fluorophenyl-4-heptylcyclohexane |
| EPCH-20CF$_3$: | 1-(trans-4-ethylcyclohexyl)-2-(p-trifluoromethoxyphenyl)ethane |
| EPCH-30CF$_3$: | 1-(trans-4-propylcyclohexyl)-2-(p-trifluoromethoxyphenyl)ethane |
| EPCH-50CF$_3$: | 1-(trans-4-pentylcyclohexyl)-2-(p-trifluoromethoxyphenyl)ethane |
| EPCH-70CF$_3$: | 1-(trans-4-heptylcyclohexyl)-2-(p-trifluoromethoxyphenyl)ethane |
| PCH-30CF$_3$: | trans-1-p-trifluoromethoxyphenyl-4-propylcyclohexane |
| PCH-50CF$_3$: | trans-1-p-trifluoromethoxyphenyl-4-pentylcyclohexane |
| ECCP-30CF$_3$: | 1-[trans-4-(trans-4-propylcyclohexyal)-cyclohexyl]-2-(p-trifluoromethoxyphenyl)-ethane |
| ECCP-50CF$_3$: | 1-[trans-4-(trans-4-pentylcyclohexyl)cyclohexyl]-2-(p-trifluoromethoxyphenyl)ethane |
| CCP-20CF$_3$: | p-(trans-4-(trans-4-ethylcyclohexyl)cyclohexyl] trifluoromethoxybenzene |
| CCP-30CF$_3$: | p-[trans-4-(trans-4-propylcyclohexyl)cyclohexyl]trifluoromethoxybenzene |
| CCP-40CF$_3$: | p-[trans-4-(trans-4-butylcyclohexyl)cyclohexyl]trifluoromethoxybenzene |
| CCP-50CF$_3$: | p-[trans-4-(trans-4-pentylcyclohexyl)cyclohexyl]trifluoromethoxybenzene |
| BCH-30CF$_3$: | 4-trifluoromethoxy-4'-(trans-4-propylcyclohexyl)biphenyl |
| ECCP-3F.F: | 1-[trans-4-(trans-4-propylcyclohexyl)cyclohexyl]-2-(3,4-difluorophenyl)ethane |
| ECCP-5F.F: | 1-[trans-4-(trans-4-pentylcyclohexyl)cyclohexyl]-2-(2,3-difluorophenyl)ethane |
| CCP-3F.F: | 4-[trans-4-(trans-4-propylcyclohexyl)cyclohexyl]-1,2-difluorobenzene |
| CCP-5F.F: | 4-[trans-4-(trans-4-pentylcyclohexyl)cyclohexyl]-1,2-difluorobenzene |
| D-302FF: | 2,3-difluoro-4-ethoxyphenyl trans-4-propylcyclohexyl carboxylate |
| D-502FF: | 2,3-difluoro-4-ethoxyphenyl trans-4-pentylcyclohexyl carboxylate |
| CCP-3F: | 4-[trans-4-(trans-4-propylcyclohexyl)cyclohexyl]fluorobenzene |
| ECCP-3F: | 1-[trans-4-(trans-4-propylcyclohexyl)cyclohexyl]-2-(p-fluorophenyl)ethane |
| ECCP-5F: | 1-[trans-4-(trans-4-pentylcyclohexyl)cyclohexyl]-2-(p-fluorophenyl)ethane |
| CP-3F: | p-fluorophenyl trans-4-(trans-4-propylcyclohexyl)cyclohexanecarboxylate |
| CP-5F: | p-fluorophenyl trans-4-(trans-4-pentylcyclohexyl)cyclohexanecarboxylate |
| PYP-5F: | 2-p-fluorophenyl-5-pentylpyrimidine |
| PYP-6F: | 2-p-fluorophenyl-5-hexylpyrimidine |
| PYP-7F: | 2-p-fluorophenyl-5-heptylpyrimidine |
| PYP-30CF$_3$: | 2-p-trifluoromethoxyphenyl-5-propylpyrimidine |
| PYP-50CF$_3$: | 2-p-trifluoromethoxyphenyl-5-pentylpyrimidine |
| PYP-70CF$_3$: | 2-p-trifluoromethoxyphenyl-5-heptylpyrimidine |
| PCH-3: | p-trans-4-propylcyclohexylbenzonitrile |
| PCH-4: | p-trans-4-butylcyclohexylbenzonitrile |
| PCH-5: | p-trans-4-pentylcyclohexylbenzonitrile |
| ECCP-3: | 1-[trans-4-(trans-4-propylcyclohexyl)cyclohexyl]-2-(p-cyanophenyl)ethane |
| ECCP-3CF$_3$: | 1-[trans-4-(trans-4-propylcyclohexyl)cyclohexyl]-2-(p-trifluoromethylphenyl)ethane |
| ECCP-5CF$_3$: | 1-[trans-4-(trans-4-pentylcyclohexyl)cyclohexyl]-2-(p-trifluoromethylphenyl)ethane |
| PYP-5N.F: | 2-(3-fluoro-4-cyanophenyl)-5-pentylpyrimidine |
| PYP-7N.F: | 2-(3-fluoro-4-cyanophenyl)-5-heptylpyrimidine |
| PCH-30CF$_2$: | trans-1-p-difluoromethoxyphenyl-4-propylcyclohexane |
| PCH-50CF$_2$: | trans-1-p-difluoromethoxyphenyl-4-pentylcyclohexane |
| PCH-3-OCF$_2$: | trans-1-p-difluoromethoxyphenyl-4-propylcyclohexane |
| BCH-5.F$_2$: | 4-(trans-4-pentylcyclohexyl)-2'-fluoro-4'-ethylbiphenyl |
| K6: | 4-ethyl-4'-cyanobiphenyl |
| K9: | 4-propyl-4'-cyanobiphenyl |
| PTP-35: | 4-propyl-4'-pentyltolan |
| ME2N.F: | 3-fluoro-4-cyanophenyl 4-ethylbenzoate |
| ME3N.F: | 3-fluoro-4-cyanophenyl 4-propylbenzoate |
| ME5N.F: | 3-fluoro-4-cyanophenyl 4-pentylbenzoate |
| PCH-2: | p-trans-4-ethylcyclohexylbenzonitrile |
| PCH-7: | p-trans-4-heptylcyclohexylbenzonitrile |
| PCH-32: | trans-1-p-ethylphenyl-4-propylcyclohexane |
| CFET-3F: | 1-(4-(trans-4-propylcyclohexyl)-2-fluoro-4'-ylbiphenyl)-2-(4-fluorophenyl)ethane |
| CFET-5F: | 1-(4-(trans-4-pentylcyclohexyl)-2-fluoro-4'-ylbiphenyl)-2-(4-fluorophenyl)ethane |
| FET-3F: | 1-(2-fluoro-4-propyl-4'-ylbiphenyl)-2-(4-fluorophenyl)ethane |
| FET-5F: | 1-(2-fluoro-4-pentyl-4'-ylbiphenyl)-2-(4-fluorophenyl)ethane |
| CPTP-30CF$_3$: | 4-(trans-4-propylcyclohexyl)-4'-trifluoromethoxyethane |
| CPTP-50CF$_3$: | 4-(trans-4-pentylcyclohexyl)-4'-trifluoromethoxyethane |
| PYP3F: | 2-(4-fluorophenyl)-5-propylpyrimidine |
| PTP35: | 4-propyl-4'-pentyltolan |
| PTP45: | 4-butyl-4'-pentyltolan |
| BCH-52F: | 4-(trans-4-pentylcyclohexyl)-2-fluoro-4'-ethylbiphenyl |
| CP-302FF: | 2,3-difluoro-4-ethoxyphenyl trans-4-(trans-4-propylcyclohexyl)cyclohexanecarboxylate |
| PCH-301: | trans-1-p-methoxyphenyl-4-propylcyclohexane |
| PCH-401: | trans-1-p-methoxyphenyl-4-butylcyclohexane |
| D-302: | 4-ethoxyphenyl trans-4-propylcyclohexyl-carboxylate |
| D-402: | 4-ethoxyphenyl trans-4-butylcyclohexyl-carboxylate |
| BCH-3F.F: | 4-(trans-4-propylcyclohexyl)-3',4'-difluorobiphenyl |
| BCH-5F.F | 4-(trans-4-pentylcyclohexyl)-3',4'-difluorobiphenyl |
| EHP-3F.F: | 3,4-difluorophenyl 4-[2-(trans-4-propylcyclohexyl)ethyl]benzoate |
| EHP-5F.F: | 3,4-difluorophenyl 4-[2-(trans-4-pentylcyclohexyl)ethyl]benzoate |
| PCH-4F: | trans-1-p-fluorophenyl-4-butyl cyclohexane |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A supertwist liquid-crystal display comprising
two plane-parallel outer plates which, together with a frame, form a cell;
a nematic liquid-crystal mixture of positive dielectric anisotropy which is present in said cell;
electrode layers with superposed alignment layers on the insides of said outer plates;
a pitch angle between the longitudinal axes of the molecules at the surface of said outer plates and said outer plates of about 1 degree–30 degrees; and
a twist angle of the liquid-crystal mixture in the cell from alignment layer to alignment layer with a value of 100°–600°;
wherein said nematic liquid-crystal mixture:
(a) is based on component A, which contains
(a1) one or more compounds of formula IIa and one or more compounds of formula IIc:

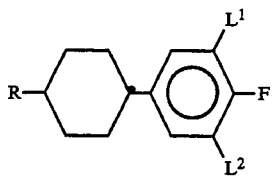

IIa

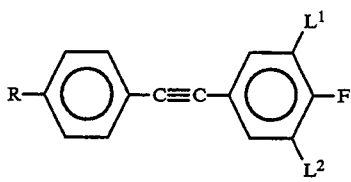

IIc wherein
R is n-alkyl, n-alkoxy or n-alkenyl having up to 9 carbon atoms, and
L¹ and L² are each H or F; and
(a2) 0–50% by weight of one or more cyano compounds of formulae C1–C4:

C1

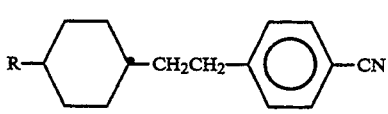

C2

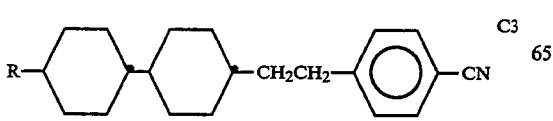

C3

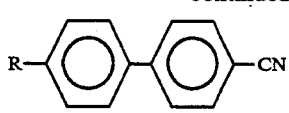

C4 wherein
R is n-alkyl, n-alkoxy or n-alkenyl having up to 9 carbon atoms; and
(b) contains 0–40% by weight of a liquid-crystalline component B, which comprises one or more compounds having a dielectric anisotropy of from −1.5 to +1.5 at 20° C. of formula I

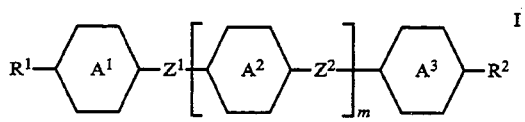

I wherein
R¹ and R² are each, independently of one another, n-alkyl, n-alkoxy, n-oxaalkyl, ω-fluoroalkyl, n-alkenyl or n-alkenyloxy having up to 9 carbon atoms,
A¹, A² and A³ are each, indecently of one another, 1,4-phenylene, 2- or 3-fluoro-1,4-phenylene, trans-1,4-cyclohexylene or 1,4-cryclohexenylene,
Z¹ and Z² are each, independently of one another, —CH₂CH₂—, —C≡C— or a single bond, and
m is 0, 1 or 2;
(c) contains 0–20% by weight of a liquid-crystalline component C which comprises one o more compounds having a dielectric anisotropy of below −1.5 and 20° C.; and
(d) contains an optically active component D in an amount that the ratio between the layer thickness and natural pitch of the chiral nematic liquid-crystal mixture is 0.2–1.7; and
wherein said nematic liquid-crystal has a nematic phase range of at least 60° C., viscosity of not more than 35 mPa.s at 20° C. and a dielectric anisotropy of at least +1 at 20° C.

2. A liquid-crystal mixture comprising:
(a) component A, which contains
(a1) one or more compounds of formula IIc:

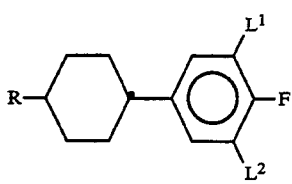

IIa

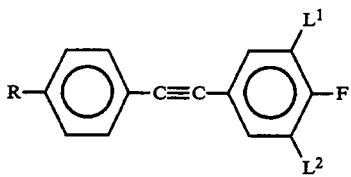

IIc wherein
R is n-alkyl, n-alkoxy or n-alkenyl having up to 9 carbon atoms, and $L^1$ and $L^2$ are each H or F; and (a2) 0–50% by weight of one or more cyano compounds of formulae C1–C4:

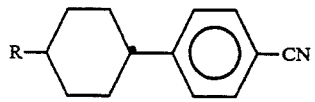
C1

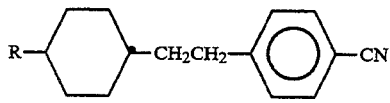
C2

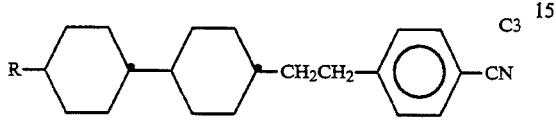
C3

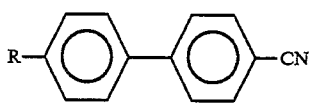
C4 wherein

R is n-alkyl, n-alkoxy or n-alkenyl having up to 9 carbon atoms; and (b) contains 0–40% by weight of a liquid-crystalline component B, which comprises one or more compounds having a dielectric anisotropy of from −1.5 to +1.5 at 20° C., of formula I

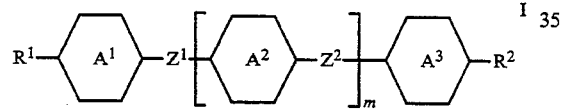
I wherein $R^1$ and $R^2$ are each, independently of one another, n-alkyl, n-alkoxy, n-oxaalkyl, ω-fluoroalkyl, n-alkenyl or n-alkenyloxy having up to 9 carbon atoms, $A^1$, $A^2$ and $A^3$ are each, independently of one another, 1,4-phenylene, 2- or 3-fluoro-1,4-phenylene, trans-1,4-cyclohexylene or 1,4-cyclohexenylene, hexenylene, $Z^1$ and $Z^2$ are each, independently of one another, —CH₂CH₂—, —C≡C— or a single bond, and m is 0, 1 or 2;

(c) contains 0–20% by weight of a liquid-crystalline component C which comprises one or more compounds having a dielectric anisotropy of below −1.5 at 20° C.; and (d) contains an optically active component D in such an amount that the ratio between the layer thickness and natural pitch of the chiral nematic liquid-crystal mixture is 0.2—1.7; and wherein said nematic liquid-crystal has a nematic phase range of at least 60° C., viscosity of not more than 35 mPa.s at 20° C. and a dielectric anisotropy of at least +1 at 20° C.

3. A display according to claim 1, wherein component A further contains one or more compounds of formulae IIf–IIk

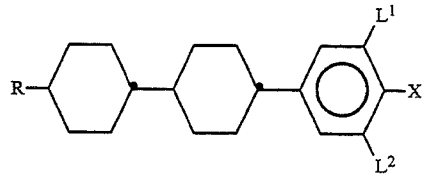
IIf

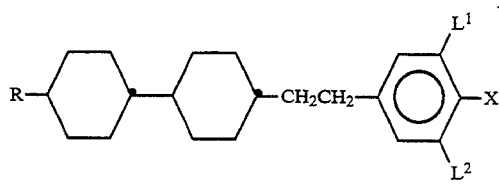
IIg

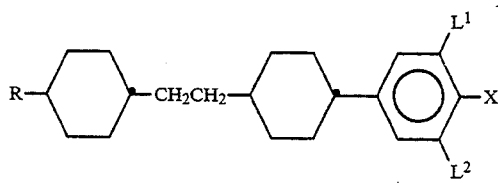
IIh

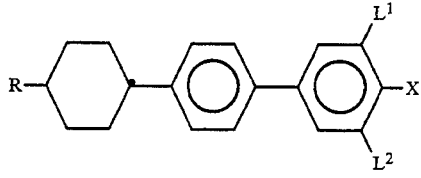
IIi

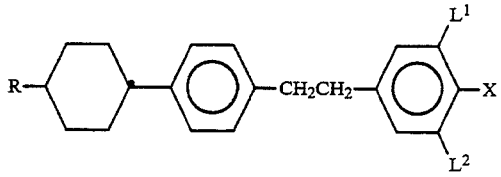
IIj

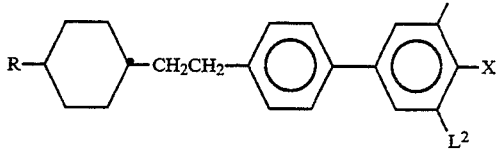
IIk wherein

R is n-alkyl, n-alkoxy or n-alkenyl having up to 9 carbon atoms, $L^1$ and $L^2$ are each H or F, and X is F, Cl, —CF₃, —CHF₂, —OCF₃, —OCHF₂, —OCF₂CF₂H or —OC₂H₅.

4. A display according to claim 1, wherein $L^1$ in formula IIa is F.

5. A display according to claim 1, wherein $L^2$ in formula IIa is F.

6. A display according to claim 1, wherein $L^1$ in formula IIc is F.

7. A display according to claim 1, wherein $L^2$ in formula IIc is F.

8. A liquid-crystal mixture according to claim 2, wherein component A further contains one or more compounds of formulae IIf–IIk

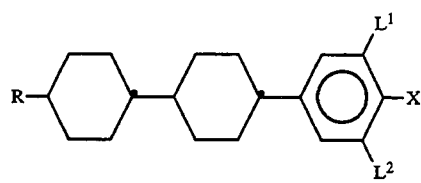 IIf

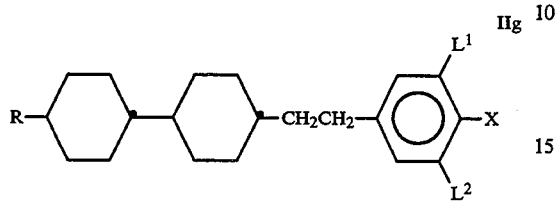 IIg

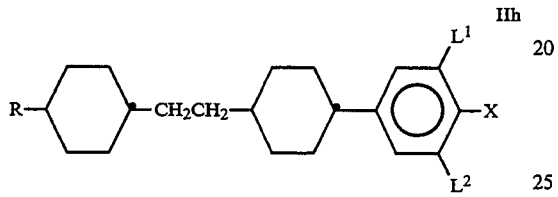 IIh

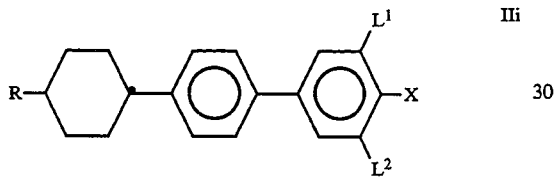 IIi

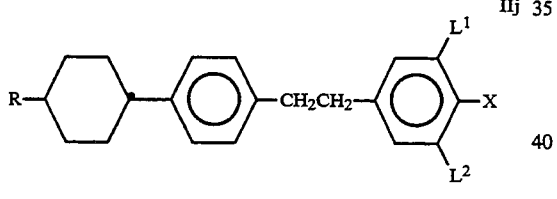 IIj

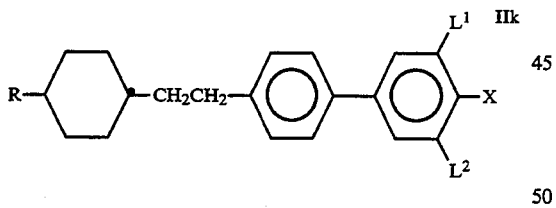 IIk wherein

R is n-alkyl, n-alkoxy or n-alkenyl having up to 9 carbon atoms, $L^1$ and $L^2$ are each H or F, and X is F, Cl, —CF₃, —CHF₂, —OCF₃, —OCHF₂, —OCF₂CF₂H or —OC₂H₅.

9. A display according to claim 3, wherein component A contains compounds of formulae IIg and IIi in which X is F and compounds of the formulae IIf, IIg and IIi in which X is —CF₃ or —CHF₂.

10. A display according to claim 3, wherein X is F, Cl, CF₃, OCF₃, OCHF₂ or CHF₂.

11. A display according to claim 1, wherein component B contains one or more compounds selected from the formulae I1 to I8:

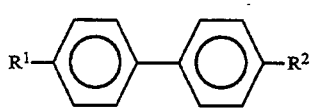 I1

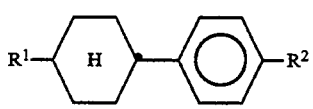 I2

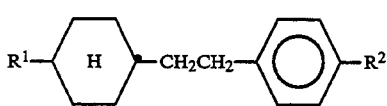 I3

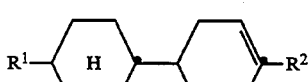 I4

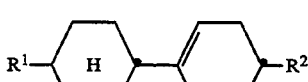 I5

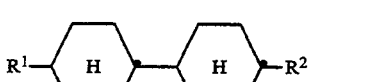 I6

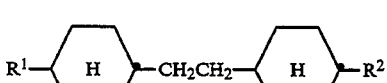 I7

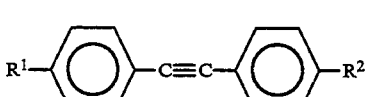 I8 wherein $R^1$ and $R^2$ are each, independently one another, n-alkyl, n-alkoxy, n-oxaalkyl, ω-fluoroalkyl or n-alkenyl having up to 9 carbon atoms.

12. A display according to claim 11, wherein component B additionally contains one or more compounds selected from formulae I9 to I24:

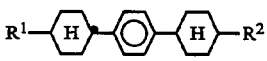 I9

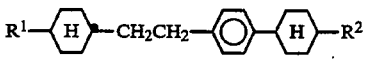 I10

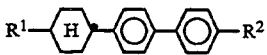 I11

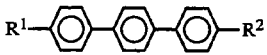 I12

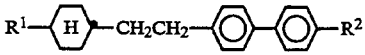 I13

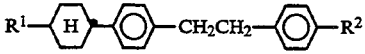 I14

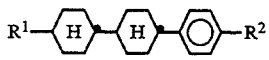 I15

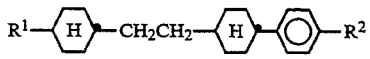 I16

 I17

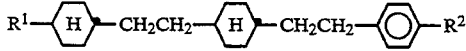 I18

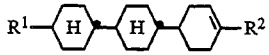 I19

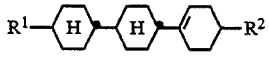 I20

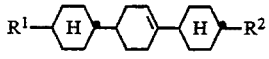 I21

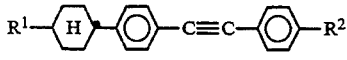 I22

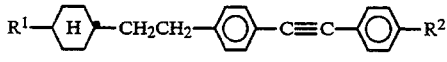 I23

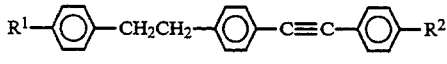 I24 wherein R¹ and R² are each, independently of one another, n-alkyl, n-alkoxy, n-oxaalkyl, ω-fluoroalkyl or n-alkenyl having up to 9 carbon atoms, and the 1,4-phenylene groups in I9 to I18 may each, independently of one another also be monosubstituted by fluorine.

13. A display according to claim 11, wherein component B additionally contains one or more compounds selected from formulae I25 to I29:

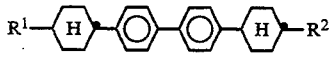 I25

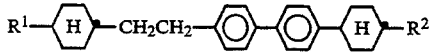 I26

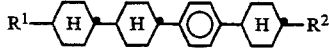 I27

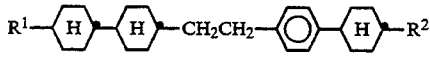 I28

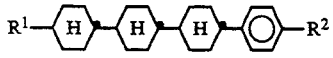 I29 wherein R¹ and R² are each, independently of one another, n-alkyl, n-alkoxy, n-oxaalkyl, ω-fluoroalkyl or n-alkenyl having up to 9 carbon atoms, and the 1,4-phenylene groups in I25 to I29 may each, independently of one another, also be monosubstituted by fluorine.

14. A display according to claim 12, wherein component B additionally contains one or more compounds selected from formulae I25 to I29:

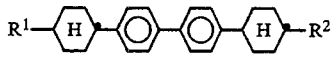 I25

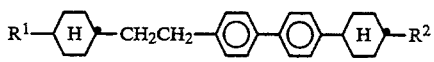 I26

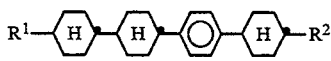 I27

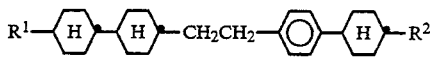 I28

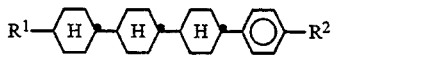 I29 wherein R¹ and R² are each, independently of one another, n-alkyl, n-alkoxy, n-oxaalkyl, ω-fluoroalkyl or n-alkenyl having up to 9 carbon atoms, and the 1,4-phenylene groups in I25 to I29 may each, independently of one another, also be monosubstituted by fluorine.

15. A display according to claim 1, wherein component B contains one or more compounds selected from the group comprising I30 and I31:

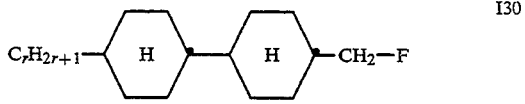 I30

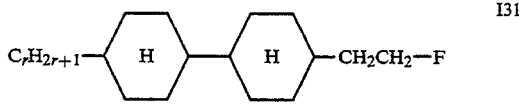 I31 in which $C_rH_{2r+1}$ is a straight-chain alkyl group and r is 1 to 7.

16. A display according to claim 1, wherein said liquid-crystal mixture further contains one or more compounds selected from formulae III and IV:

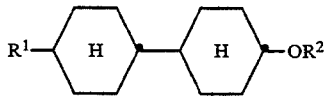 III

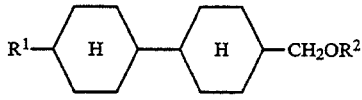 IV in which R² and R² are each, independently of one another, n-alkyl, n-alkoxy, n-oxaalkyl, ω-fluoroalkyl or n-alkenyl having up to 9 carbon atoms.

17. A display according to claim 1, wherein said liquid-crystal mixture further contains one or more compounds selected from formulae V and VI:

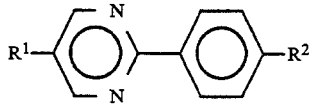 V

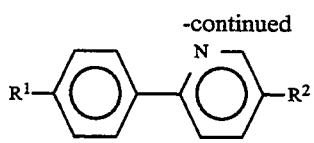

in which R² and R² are each, independently of one another, n-alkyl, n-alkoxy, n-oxaalkyl, ω-fluoroalkyl or n-alkenyl having up to 9 carbon atoms.

18. A display according to claim 1, wherein component C contains one or more compounds selected from formulae VII to XI:

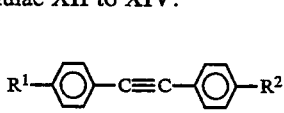

in which R¹ and R² are each, independently of one another, n-alkyl, n-alkoxy, n-oxaalkyl, w-fluoroalkyl or n-alkenyl having up to 9 carbon atoms, and s is 0 or 1.

19. A display according to claim 1, wherein component B contains one or more compounds selected from formulae XII to XIV:

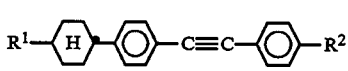

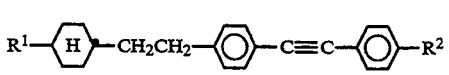

in which R¹ and R² are each, independently of one another, n-alkyl, n-alkoxy, n-oxaalkyl, ω-fluoroalkyl or n-alkenyl having up to 9 carbon atoms.

20. A display according to claim 1, wherein said liquid-crystal mixture further contains a) at least one component selected from group B4, comprising compounds of the formulae AI to AVI:

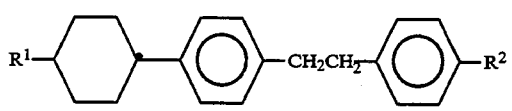

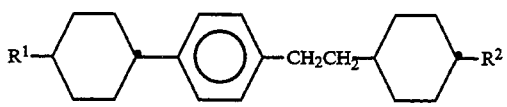

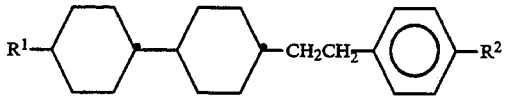

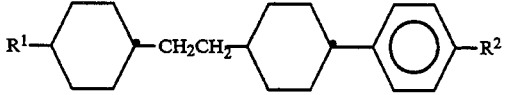

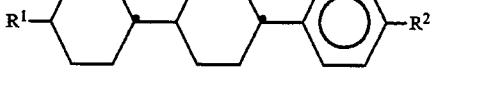

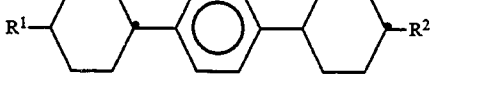

in which

R¹ and R², in each case independently of one another, are each R, and

R is alkyl having 1-12 carbon atoms in which, in addition, one or two non-adjacent CH₂ groups may be replaced by —O—, —CH=CH—, —CO—, —O—CO— or —CO—O—, b) and/or at least one component selected from group B1, comprising the compounds of the formulae BI to BIV:

in which R¹ and R² in each case independently of one another, are as defined for R, Z² is —CH₂CH₂—, —CO—O—, —O—CO— or a single bond, and

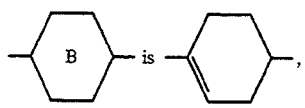

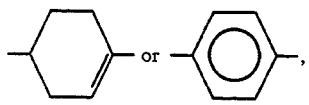

c) and/or at least one component selected from group B2, comprising the compounds of the formulae BV to BVIII:

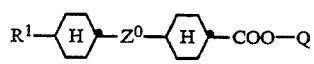 BV

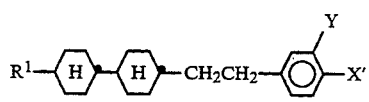 BVI

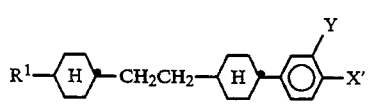 BVII

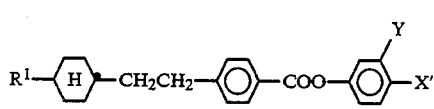 BVIII in which $R^1$ is as defined for R, $Z^0$ is —CH$_2$CH$_2$— or a single bond, and

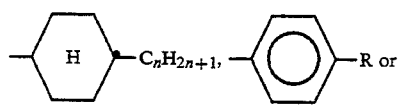

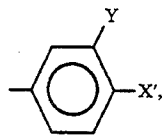

wherein n is 1 to 9, X' is CN or F, and Y is H or F, d) and/or at least one component selected from group B3, comprising the compounds of the formulae BIX and BX:

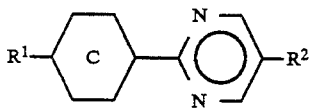 BIX

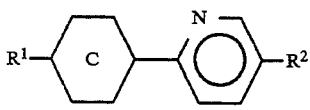 BX in which $R^1$ and $R^2$ in each case independently of one another, are as defined for R, and

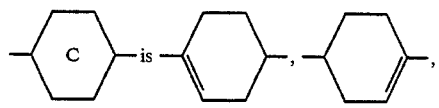

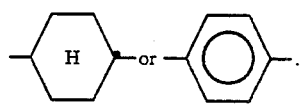

21. A display according to claim 1, wherein said liquid-crystal mixture further contains at least one compound of the following formulas:

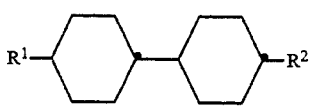

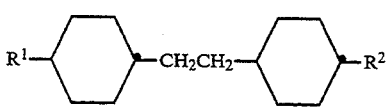

in which
$R^1$ is CH$_3$—(CH$_2$)$_n$—O—, CH$_3$—(CH$_2$)$_r$—, trans-H—(CH$_2$)$_r$—CH=CH—(CH$_2$CH$_2$)$_s$—CH$_2$O— or trans-H—(CH$_2$)$_r$—CH=CH—(CH$_2$CH$_2$)$_s$—,
$R^2$ is CH$_3$—(CH$_2$)$_r$—,
n is 1, 2, 3 or 4,
r is 0, 1, 2 or 3,
s is 0 or 1, and
t is 1, 2, 3 or 4.

22. A display according to claim 1, wherein said liquid-crystal mixture further contains a compound of the formula:

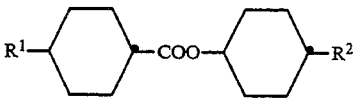

in which
$R^1$ is CH$_3$—(CH$_2$)$_n$—O—, CH$_3$—(CH$_2$)$_r$—, trans-H—(CH$_2$)$_r$—CH=CH—(CH$_2$CH$_2$)$_s$—CH$_2$O— or trans—H—(CH$_2$)$_r$—CH=CH—(CH$_2$CH$_2$)$_s$—,
$R^2$ is CH$_3$—(CH$_2$)$_r$—,
n is 1, 2, 3 or 4,
r is 0, 1, 2 or 3,
s is 0 or 1, and
t is 1, 2, 3 or 4.

23. A display according to claim 1, wherein said liquid-crystal mixture contains at least one compound of formulae BV2, BV3, BVI1 or BVIII1:

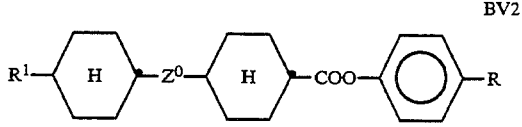 BV2

-continued

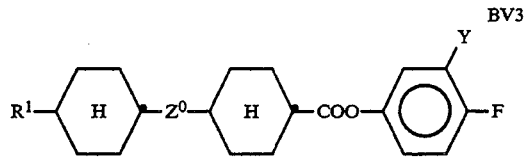
BV3

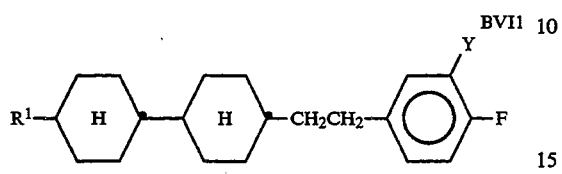
BVI1

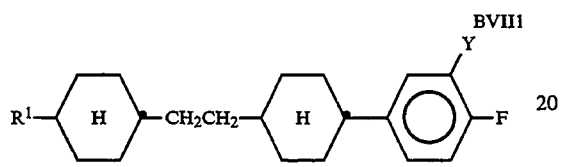
BVII1 in which
R¹ is n-alkyl having 1 to 7 carbon atoms or (trans)-n-alkenyl having 3 to 7 carbon atoms;
$Z^0$ single bond;
R is n-alkyl having 1 to 7 carbon atoms, (trans)-n-alkenyl having 3 to 7 carbon atoms, or fluorine; and
Y is fluorine;
and further comprises at least one compound selected from the formulae

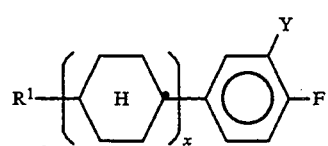

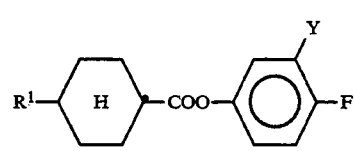

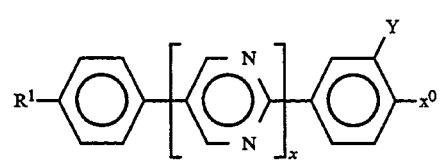

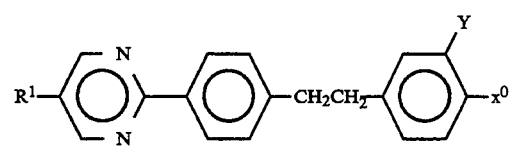

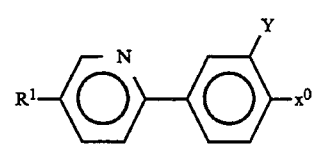

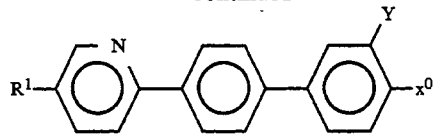

in which
R¹ is n-alkyl having 1 to 7 carbon atoms or (trans)-n-alkenyl having 3 to 7 carbon atoms,
X is 1 or 2,
$x^0$ is F, Cl, CF₃, —OCF₃ or —OCHF₃, and
is H or F.

24. A display according to claim 1, wherein component A of said nematic liquid-crystalline mixture contains 0–50% by weight of one or more cyano compounds of formulae C1–C3

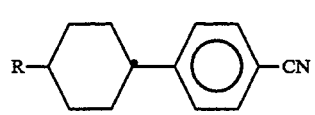
C1

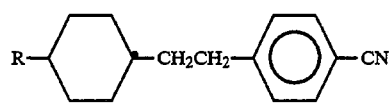
C2

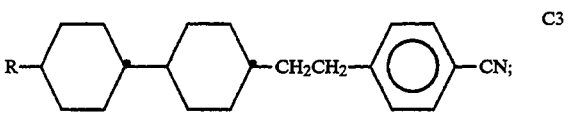
C3

R¹ and R² of formula I are each, independently, n-alkyl, n-alkoxy, n-oxaalkyl, ω-fluoroalkyl or n-alkenyl having up to 9 carbon atoms; and
L² in formulae IIa and IIc is H.

25. A liquid-crystalline mixture according to claim 2, wherein
component A of said nematic liquid-crystalline mixture contains 0–50% by weight of one or more cyano compounds of formulae C1–C3

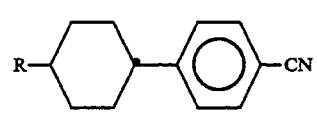
C1

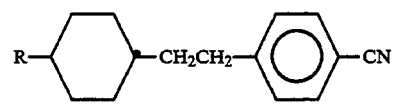
C2

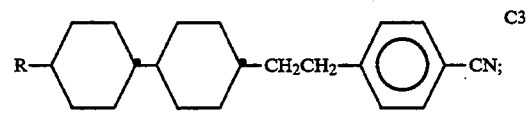
C3

R¹ and R² of formula I are each, independently, n-alkyl, n-alkoxy, n-oxaalkyl, ω-fluoroalkyl or n-alkenyl having up to 9 carbon atoms; and
L² in formulae IIa and IIc is H.

26. A display according to claim 1, wherein said nematic liquid-crystalline mixture exhibits a Δn value of 0.1406 or more.

27. A liquid-crystalline mixture according to claim 2, wherein said mixture exhibits a Δn value of 0.1406 or more.

* * * * *

UNITED STATES PATENT AND TRADEMARK OFFICE
CERTIFICATE OF CORRECTION

PATENT NO. : 5,374,374
DATED : December 20, 1994
INVENTOR(S) : Georg WEBER et al.

It is certified that error appears in the above-indentified patent and that said Letters Patent is hereby corrected as shown below:

Claim 1; column 28, lines 28-29: Delete "cryclohexenylene" and insert - - cyclohexenylene - -.

Claim 2; column 28, line 49: After "formula" insert - - IIa and one or more compounds of formula - - .

Claim 2; column 29, line 48: Delete "hexenylene".

Claim 2; column 29, line 57: Delete "such".

Signed and Sealed this

Eleventh Day of April, 1995

Attest:

BRUCE LEHMAN

Attesting Officer

Commissioner of Patents and Trademarks